United States Patent
Byers et al.

(10) Patent No.: US 9,447,481 B1
(45) Date of Patent: Sep. 20, 2016

(54) DIPENTENE DIMERCAPTAN COMPOSITIONS AND USE THEREOF AS A MINING CHEMICAL COLLECTOR

(71) Applicant: Chevron Phillips Chemical Company LP, The Woodlands, TX (US)

(72) Inventors: Jim D. Byers, Bartlesville, OK (US); Michael S. Matson, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 14/876,902

(22) Filed: Oct. 7, 2015

(51) Int. Cl.
*B03D 1/012* (2006.01)
*C22B 3/20* (2006.01)
*C22B 15/00* (2006.01)
*C22B 34/34* (2006.01)

(52) U.S. Cl.
CPC ........... *C22B 15/0089* (2013.01); *B03D 1/012* (2013.01); *C22B 3/20* (2013.01); *C22B 34/34* (2013.01); *B03D 2201/02* (2013.01); *B03D 2203/025* (2013.01)

(58) Field of Classification Search
CPC .... C22B 3/20; B03D 1/012; B03D 2203/02; B03D 2203/025
See application file for complete search history.

(56) References Cited

U.S. PATENT DOCUMENTS

| 3,616,374 A | 10/1971 | Goshorn et al. |
| 4,140,604 A | 2/1979 | Dimmig |
| 4,594,151 A | 6/1986 | Delourme et al. |
| 4,857,179 A | 8/1989 | Kimble et al. |
| 7,014,048 B2 * | 3/2006 | Anglerot ................ B03D 1/008 209/166 |
| 8,461,293 B2 | 6/2013 | Matson et al. |
| 2007/0238848 A1 * | 10/2007 | Bojkova ................ C08G 18/12 528/44 |

OTHER PUBLICATIONS

Dipentene Dimercaptan Tech Data Sheet, Chevron Phillips Chemical Company, Feb. 2011, 1 page.

* cited by examiner

*Primary Examiner* — George Wyszomierski
*Assistant Examiner* — Tima M McGuthry Banks
(74) *Attorney, Agent, or Firm* — Merchant & Gould P.C.

(57) ABSTRACT

The present invention shows polythiol compositions containing dipentene dimercaptans and intermolecular sulfide compounds, as well as mining chemical collector compositions containing such polythiol compositions. Flotation processes for recovering metals, such as copper and molybdenum, from ores using the mining chemical collector compositions also are shown.

20 Claims, No Drawings

DIPENTENE DIMERCAPTAN COMPOSITIONS AND USE THEREOF AS A MINING CHEMICAL COLLECTOR

BACKGROUND OF THE INVENTION

The present invention relates generally to polythiol compositions containing dipentene dimercaptans and intermolecular sulfide compounds, and to methods for producing such polythiol compositions. These polythiol compositions can be used in mining chemical collector compositions, and the collector compositions can be used in flotation processes for recovering metals from ores.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Various mining chemical collector compositions and polythiol compositions comprising sulfur-containing compounds are disclosed herein. In one embodiment, a collector composition of this invention can comprise a polythiol composition and water, while in another embodiment, a collector composition can comprise a polythiol composition and a pH control agent, and in yet another embodiment, a collector composition can comprise a polythiol composition and a frothing agent. Accordingly, a particular collector composition of this invention can comprise a polythiol composition, a frothing agent, a pH control agent, and water.

In these and other embodiments, suitable polythiol compositions comprising sulfur-containing compounds are disclosed, and the sulfur-containing compounds can comprise (i) dipentene dimercaptan compounds and (ii) at least 4% of a heavy fraction comprising intermolecular sulfide compounds having at least one thiol sulfur group (—SH), at least one intermolecular sulfide group (—S—), and at least two substituted cyclohexyl groups. A representative dipentene dimercaptan compound can have the following structure:

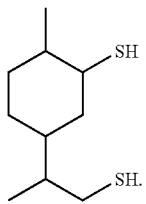

Flotation processes for the recovery of a metal (or metals) from an ore also are disclosed herein. These processes can comprise contacting the ore with any of the collector compositions and/or any of the polythiol compositions disclosed herein. The metal can comprise any suitable transition metal, such as copper, molybdenum, and the like, as well as combinations of two or more metals.

Both the foregoing summary and the following detailed description provide examples and are explanatory only. Accordingly, the foregoing summary and the following detailed description should not be considered to be restrictive. Further, features or variations can be provided in addition to those set forth herein. For example, certain embodiments can be directed to various feature combinations and sub-combinations described in the detailed description.

DEFINITIONS

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter can be described such that, within particular aspects and/or embodiments, a combination of different features can be envisioned. For each and every aspect, and/or embodiment, and/or feature disclosed herein, all combinations that do not detrimentally affect the designs, compositions, processes, and/or methods described herein are contemplated with or without explicit description of the particular combination. Additionally, unless explicitly recited otherwise, any aspect, and/or embodiment, and/or feature disclosed herein can be combined to describe inventive features consistent with the present disclosure.

While compositions and methods are described herein in terms of "comprising" various components or steps, the compositions and methods can also "consist essentially of" or "consist of" the various components or steps, unless stated otherwise. For example, a collector composition consistent with embodiments of the present invention can comprise; alternatively, can consist essentially of; or alternatively, can consist of; a polythiol composition, a pH control agent, a frothing agent, and water.

The terms "a," "an," and "the" are intended to include plural alternatives, e.g., at least one. For instance, the disclosure of "a solvent," "a transition metal," etc., is meant to encompass one, or mixtures or combinations of more than one, solvent, transition metal, etc., unless otherwise specified.

Generally, groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

For any particular compound or group disclosed herein, any name or structure presented is intended to encompass all structural isomers, conformational isomers, regioisomers, stereoisomers, and mixtures thereof that can arise from a particular set of substituents, unless otherwise specified. The name or structure also encompasses all enantiomers, diastereomers, and other optical isomers (if there are any), whether in enantiomeric or racemic forms, as well as mixtures of stereoisomers, as would be recognized by a skilled artisan, unless otherwise specified. For example, a general reference to hexene (or hexenes) includes all linear or branched, acyclic or cyclic, hydrocarbon compounds having six carbon atoms and 1 carbon-carbon double bond; pentane includes n-pentane, 2-methyl-butane, and 2,2-dimethylpropane; a general reference to a butyl group includes an n-butyl group, a sec-butyl group, an iso-butyl group, and a t-butyl group; a general reference to cyclododecatriene includes all isomeric forms (e.g., trans,trans,cis-1,5,9-cyclododecatriene, and trans,trans,trans-1,5,9-cyclododecatriene, among other dodecatrienes); and a general reference to 2,3-pentanediol includes 2R,3R-pentanediol, 2S,3S-pentanediol, 2R,3S-pentanediol, and mixtures thereof.

In one embodiment, a chemical "group" can be defined or described according to how that group is formally derived from a reference or "parent" compound, for example, by the number of hydrogen atoms removed from the parent compound to generate the group, even if that group is not literally synthesized in such a manner. These groups can be utilized as substituents, can be coordinated or bonded to metal atoms, or can be substituted or unsubstituted. By way of example, an "alkyl group" formally can be derived by removing a hydrogen atom (one or more, as necessary for the particular group) from a carbon atom of an alkane. The disclosure that a substituent, ligand, or other chemical moiety can constitute a particular "group" implies that the well-known rules of chemical structure and bonding are followed when that group is employed as described. When describing a group as being "derived by," "derived from," "formed by," or "formed from," such terms are used in a formal sense and are not intended to reflect any specific synthetic methods or procedures, unless specified otherwise or the context requires otherwise.

As used herein, "thiol sulfur" means sulfur from a —SH group (thiol group), while "sulfide sulfur" means sulfur from a —S— group (sulfide group). Sulfide sulfur groups encompass both intermolecular sulfide groups and intramolecular sulfide groups. The term "intermolecular sulfide" as used herein refers to sulfide bonds formed by a reaction between two molecules. The term "intramolecular sulfide" refers to sulfide bonds formed by a reaction within a single molecule.

As used herein, a "polythiol composition" refers to a composition comprising polythiol molecules. Polythiol molecules refer to molecules having two or more thiol groups per molecule (e.g., 2, 3, etc., thiol groups). For illustrative purposes, in addition to polythiol molecules having 2 SH groups, a polythiol composition also can contain compounds having only 1 thiol group, compounds having only one sulfur atom present as sulfide sulfur, etc. Furthermore, such polythiol compositions can contain other compounds and components, non-limiting examples of which can include solvents and other materials, as well as residual limonene from which the polythiol composition may be derived.

In some instances, the polythiol composition is described, while in others, the sulfur-containing compounds (i.e., having at least 1 sulfur atom present as thiol sulfur or sulfide sulfur) of the polythiol composition are described. Consequently, within this disclosure, properties associated with polythiol compositions can include contributions from the limonene from which the compositions can be formed, as well as other reactants and by-products. In some circumstances, it can be beneficial to refer only to the sulfur-containing compounds, as if the limonene, other reactants, by-products, and/or solvent are not present in the composition. Accordingly, within this disclosure, the term "sulfur-containing compounds," used in conjunction with the polythiol composition, refers to organic compounds within the composition that contain at least one sulfur atom present in a thiol sulfur group or sulfide sulfur group, and excludes any non-sulfur-containing compound (e.g., limonene reactant and/or solvent, among others), and excludes any sulfur-containing reactant (e.g., $H_2S$). In sum, a polythiol composition can include all materials in a composition comprising polythiol molecules, while the sulfur-containing compounds refer only to the compounds within the polythiol composition having at least sulfur atom present in a —SH or a —S— group.

As utilized herein, the mercaptan equivalent weight (SHEW) equals the molecular weight of a particular mercaptan molecule divided by the number of mercaptan groups in the mercaptan molecule, and has the units of grams/equivalent (g/eq). When referring to a composition of sulfur-containing compounds, the SHEW refers to an average SHEW of all the sulfur-containing compounds in the composition.

The terms "contact product," "contacting," and the like, are used herein to describe compositions and methods wherein the components are contacted together in any order, in any manner, and for any length of time, unless otherwise specified. For example, the components can be contacted by blending or mixing. Further, unless otherwise specified, the contacting of any component can occur in the presence or absence of any other component of the compositions and methods described herein. Combining additional materials or components can be done by any suitable method. Further, the term "contact product" includes mixtures, blends, solutions, slurries, reaction products, and the like, or combinations thereof. Although "contact product" can, and often does, include reaction products, it is not required for the respective components to react with one another. Similarly, the term "contacting" is used herein to refer to materials which can be blended, mixed, slurried, dissolved, reacted, treated, or otherwise contacted in some other manner. Therefore, the term "contacting" encompasses the "reacting" of two or more components, and it also encompasses the "mixing" or "blending" of two or more components that do not react with one another.

Although any methods and materials similar or equivalent to those described herein can be used in the practice or testing of the invention, the typical methods and materials are herein described.

All publications and patents mentioned herein are incorporated herein by reference for the purpose of describing and disclosing, for example, the constructs and methodologies that are described in the publications, which might be used in connection with the presently described invention.

DETAILED DESCRIPTION OF THE INVENTION

The present invention provides mining chemical collector compositions containing polythiol compositions derived from limonene. While not wishing to be bound by theory, a potential benefit of these collector compositions, which comprise sulfur-containing compounds, is less objectionable odor, as compared to other collector compositions that do not comprise the polythiol heavy fraction, sulfide group (—S— group) functionality, and other compositional attributes disclosed herein. Moreover, in contrast to the prevailing knowledge in the mining chemical collector arts, in which it is believed that good collectors have only one functional group (e.g., like a mercaptan or thiol group) connected to a long-chain hydrocarbon (e.g., a $C_{12}$ hydrocarbon), it was unexpectedly found in this invention that the compositions disclosed herein provide excellent collector performance in spite of containing two or more functional groups (e.g., sulfide groups, mercaptan or thiol groups), as well as short hydrocarbon chains therebetween.

Polythiol Compositions

Polythiol compositions consistent with embodiments of the invention disclosed and described herein can comprise sulfur-containing compounds, and these sulfur-containing compounds can comprise dipentene dimercaptan compounds and at least 4% of a heavy fraction comprising intermolecular sulfide compounds having at least one thiol sulfur group (—SH), at least one intermolecular sulfide group (—S—), and at least two substituted cyclohexyl groups.

Dipentene dimercaptan compounds can include the following representative cyclohexyl-containing structure:

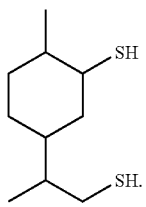

Unless otherwise specified, the name and structural formula above, any other names and structural formulas disclosed herein, and any group, species, or compound disclosed herein are not designed to show stereochemistry or isomeric positioning of the different moieties, although such compounds are contemplated and encompassed by these names and/or formulas and/or structures, unless stated otherwise. For instance, the disclosure of "dipentene dimercaptan compounds" is meant to encompass cyclohexyl-containing compounds such as the Markovnikov isomer shown below, which can be produced by the addition of H$_2$S to limonene, as would be recognized by those of skill in the art:

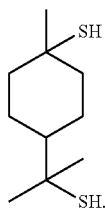

The heavy fraction can comprise intermolecular sulfide compounds having at least one thiol sulfur group (—SH), at least one intermolecular sulfide group (—S—), and at least two substituted cyclohexyl groups. In particular embodiments of this inventions, the heavy fraction can comprise intermolecular sulfide compounds having two thiol sulfur groups (—SH), one intermolecular sulfide group (—S—), and two substituted cyclohexyl groups. Further, each substituted cyclohexyl group can have a thiol group substituent directly on a ring carbon of the cyclohexyl group or an alkylthiol substituent with a carbon atom of the alkyl bonded to a ring carbon of the cyclohexyl group.

Illustrative and non-limiting examples of these sulfur-containing compounds having two thiol sulfur groups (—SH), one intermolecular sulfide group (—S—), and two substituted cyclohexyl groups, can include the following compounds:

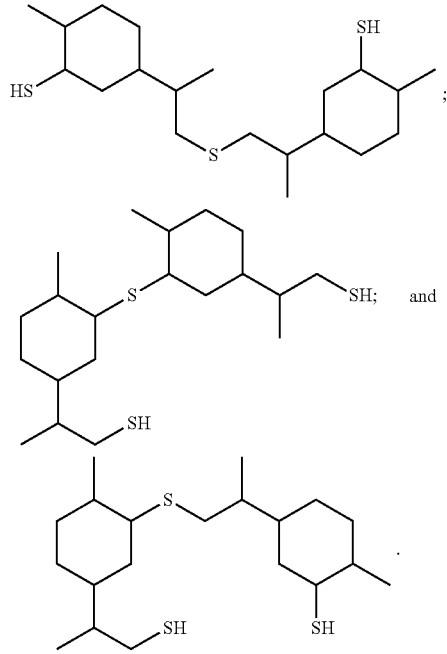

Moreover, as would be recognized by those of skill in the art, the sulfur-containing compounds of the polythiol composition can comprise other intermolecular sulfide isomers having the same molecular formulas as these intermolecular sulfide compounds, and such isomeric compounds also are encompassed herein.

In these and other embodiments, the polythiol compositions comprising sulfur-containing compounds disclosed herein can further comprise one or more sulfide molecules having two thiol sulfur groups (—SH), two intermolecular sulfide groups (—S—), and three substituted cyclohexyl groups. Illustrative and non-limiting examples of these sulfur-containing compounds having two thiol sulfur groups (—SH), two intermolecular sulfide groups (—S—), and three substituted cyclohexyl groups, can include the following compounds:

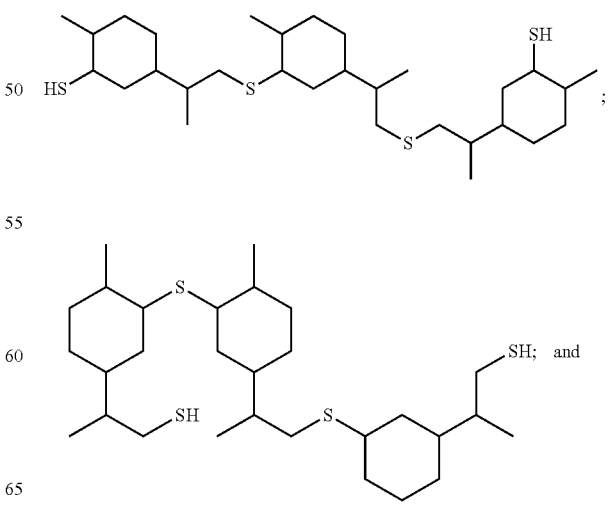

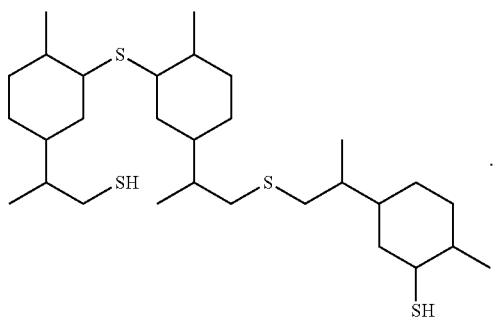 [SMILES: CC1CCC(C(C)CSCC(C)C2CCC(C)C(SC3CC(C(C)CS)CCC3C)C2)CC1S]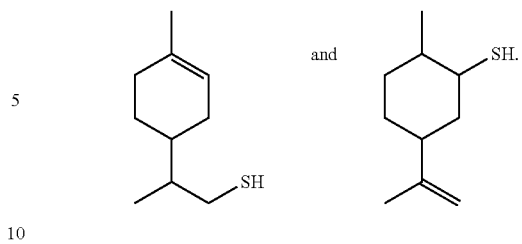

Moreover, as would be recognized by those of skill in the art, the sulfur-containing compounds of the polythiol composition can comprise other isomers having the same molecular formulas as these compounds having two intermolecular sulfide groups, and such isomeric compounds are encompassed herein.

Unless otherwise indicated, the compositional aspects of these polythiol compositions (or of the sulfur-containing compounds of the compositions) are disclosed in GC area % (area percentage determined using a Gas Chromatograph with a F.I.D. detector, as described herein), because such polythiol compositions are generally analyzed or evaluated in this manner. While not wishing to be bound by this theory, it is believed that the amount in area % is very similar to the amount in wt. %, but these respective amounts are not identical or exactly interchangeable.

The illustrative and non-limiting examples of polythiol compositions comprising sulfur-containing compounds provided hereinabove also can have any of the characteristics or properties provided below, and in any combination.

In an embodiment, the sulfur-containing compounds of the polythiol composition can contain at least 4%, at least 5%, or at least 6% of the heavy fraction (i.e., comprising intermolecular sulfide compounds). Suitable non-limiting ranges for the amount of the heavy fraction, based on the sulfur-containing compounds of the composition, can include the following ranges: from 4% to 30%, from 4% to 25%, from 4% to 15%, from 5% to 25%, from 5% to 20%, from 5% to 15%, from 6% to 25%, from 6% to 20%, or from 6% to 15%. Other appropriate ranges for the amount of the heavy fraction containing intermolecular sulfide compounds are readily apparent from this disclosure.

In an embodiment, the amount of dipentene dimercaptan compounds, based on the sulfur-containing compounds of the polythiol composition often can fall within a range from 50% to 95%, such as from 50% to 92%, or from 50% to 90%. In some embodiments, the dipentene dimercaptan compounds can be from 60% to 95%, from 60% to 92%, from 60% to 90%, from 70% to 95%, from 70% to 92%, from 80% to 95%, or from 80% to 92%, based on the sulfur-containing compounds present in the polythiol composition. Other appropriate ranges for the amount of the dipentene dimercaptan compounds are readily apparent from this disclosure.

Generally, the polythiol compositions can contain minimal amounts of monosulfur compounds. Illustrative and non-limiting examples of such monosulfur compounds can include the following structures:

For instance, the sulfur-containing compounds of the polythiol composition can have a maximum amount of monosulfur compounds (e.g., dipentene monomercaptan) of less than or equal to 5%, less than or equal to 4%, less than or equal to 3%, less than or equal to 2%, less than or equal to 1%, less than or equal to 0.5%, or less than or equal to 0.25%. Other appropriate ranges for the amount of the monosulfur compounds are readily apparent from this disclosure.

Generally, the polythiol compositions can contain minimal amounts of sulfur-free olefin-containing compounds, such as limonene. In some embodiments, the amount of sulfur-free olefin-containing compounds in the polythiol composition can be less than or equal to 2%, less than or equal to 1%, less than or equal to 0.5%, less than or equal to 0.25%, less than or equal to 0.1%, or less than or equal to 0.05%. Other appropriate ranges for the amount of the sulfur-free olefin-containing compounds are readily apparent from this disclosure.

In an embodiment, the sulfur-containing compounds of the polythiol composition can have a minimum average thiol sulfur to sulfide sulfur weight ratio of 3:1 or 5:1; additionally or alternatively, the sulfur-containing compounds can have a maximum average thiol sulfur to sulfide sulfur weight ratio of 100:1 or 75:1. Therefore, suitable non-limiting ranges for the average thiol sulfur to sulfide sulfur weight ratio can include the following ranges: from 3:1 to 100:1, from 3:1 to 75:1, from 3:1 to 50:1, from 5:1 to 100:1, from 5:1 to 75:1, from 5:1 to 50:1, from 10:1 to 100:1, from 10:1 to 75:1, or from 10:1 to 50:1. Other appropriate ranges for the average thiol sulfur to sulfide sulfur weight ratio are readily apparent from this disclosure.

The polythiol compositions can be further characterized by the amount of sulfide sulfur (sulfur from a —S— group) present in the sulfur-containing compounds of the composition. For instance, sulfur-containing compounds of the composition can have an average of from 0.1 wt. % to 10 wt. % sulfide sulfur. These percentages are based on the total sulfur-containing compounds of the composition, regardless of the number of thiol and/or sulfide groups. In certain embodiments, the sulfur-containing compounds of the polythiol composition can have an average sulfide sulfur content in a range from 0.1 to 5 wt. %, from 0.25 to 5 wt. %, from 0.5 to 5 wt. %, from 1 to 5 wt. %, from 0.25 to 3 wt. %, from 0.5 to 3 wt. %, from 0.75 to 7 wt. %, or from 0.75 to 4 wt. %. Other appropriate ranges for the average sulfide sulfur content are readily apparent from this disclosure.

Moreover, the polythiol compositions can be further characterized by the amount of thiol sulfur (sulfur from a —SH group) present in the sulfur-containing compounds of the composition. For example, sulfur-containing compounds of the composition can have an average of from 26 wt. % to 31 wt. % thiol sulfur. These percentages are based on the total sulfur-containing compounds, regardless of the number of thiol and/or sulfide groups. In particular embodiments, the sulfur-containing compounds of the polythiol composition can have an average thiol sulfur content of the sulfur-containing compounds that includes the following ranges: from 27 to 31 wt. %, from 27 to 30.5 wt. %, from 27 to 30.3 wt. %, from 29 to 31 wt. %, from 29 to 30.5 wt. %, from 29 to 30.2 wt. %, from 28 to 30.5 wt. %, or from 28 to 30.3 wt. %. Other appropriate ranges for the average thiol sulfur content are readily apparent from this disclosure.

Consistent with particular embodiments of this invention, the polythiol compositions can be further characterized by the mercaptan equivalent weight (or SHEW) of the composition. For instance, the minimum SHEW of sulfur-containing compounds of the composition can be 104 or 105, while the maximum SHEW of sulfur-containing compounds of the composition can be 125 or 120 g/eq. Therefore, suitable non-limiting ranges for the SHEW of the sulfur-containing compounds can include the following ranges: from 104 to 125, from 104 to 120, from 104 to 118, from 105 to 125, from 105 to 120, or from 105 to 118 g/eq. Other appropriate ranges for the SHEW are readily apparent from this disclosure.

An illustrative and non-limiting example of a polythiol composition consistent with the present invention can contain sulfur-containing compounds comprising from 60% to 95% of dipentene dimercaptan compounds, from 4% to 25% of the heavy fraction (i.e., comprising intermolecular sulfide compounds), and less than or equal to 4% of monosulfur compounds. Another illustrative and non-limiting example of a polythiol composition consistent with the present invention can contain sulfur-containing compounds comprising from 70% to 92% of dipentene dimercaptan compounds, from 5% to 15% of the heavy fraction (i.e., comprising intermolecular sulfide compounds, and less than or equal to 1% of monosulfur compounds. As would be readily recognized by those of skill in the art, the total of these components will be less than or equal to 100%.

While not wishing to be bound by the following theory, it is believed that a potential and unexpected benefit of the polythiol compositions disclosed herein (and the sulfur-containing compounds of the polythiol compositions disclosed herein) is less objectionable or offensive odor, as compared to other polythiol compositions that do not comprise sulfur-containing compounds with a sulfide group (—S— group), and/or that contain higher amounts of materials lighter than dipentene dimercaptans, and/or that contain higher amounts of materials with shorter GC retention times, and/or that contain higher amounts of monosulfur materials.

While not being limited thereto, the polythiol compositions disclosed herein can be polythiol compositions derived from limonene. In some embodiments, the polythiol compositions disclosed herein can be produced by any process described herein. For instance, these polythiol compositions can be produced by a process comprising contacting limonene, $H_2S$, and optionally, a phosphite compound; and forming the polythiol composition. The molar ratio of $H_2S$ to carbon-carbon double bonds of the limonene can be in a range, for example, from 2:1 to 500:1, from 2:1 to 50:1, or from 5:1 to 35:1. Additional information on processes for producing such polythiol compositions is provided herein.

Processes for Producing Polythiol Compositions

In accordance with certain embodiments of this invention, a process for producing a polythiol composition can comprise contacting limonene, $H_2S$, and optionally, a phosphite compound; and forming the polythiol composition. Generally, the features of the process (e.g., the use of the phosphite compound, the hydrogen sulfide to carbon-carbon double bond ratio, the components of and/or features of the polythiol composition, and the conditions under which the polythiol composition is formed, among others) are independently described herein and these features can be combined in any combination to further describe the disclosed process.

In an embodiment, the contacting step (step 1 of the process) can comprise contacting limonene, $H_2S$, and additional unrecited materials (e.g., a solvent). In other embodiments, the contacting step can consist essentially of contacting limonene and $H_2S$; or alternatively, consist of contacting limonene and $H_2S$. In some embodiments, the contacting step (step 1 of the process) can comprise contacting the limonene, $H_2S$, the optional phosphite compound, and additional unrecited materials (e.g., a solvent). In other embodiments, the contacting step can consist essentially of contacting limonene, $H_2S$, and the optional phosphite compound or, alternatively, consist of contacting limonene, $H_2S$, and the optional phosphite compound. Likewise, additional materials or features can be employed in the forming step (step 2 of the process). For instance, the formation of the polythiol composition can occur in the presence of ultraviolet light, discussed further herein. Moreover, it is contemplated that when the processes for forming polythiol compositions utilize a phosphite compound, the processes can employ more than one phosphite compound. In some embodiments, the contacting step (step 1) and the forming step (step 2) can occur simultaneously; alternatively, the contacting step (step 1) and the forming step (step 2) can occur separately; or alternatively, the contacting step (step 1) and the forming step (step 2) can occur sequentially.

In the processes disclosed herein, the minimum molar ratio of $H_2S$ to carbon-carbon double bonds of the limonene can be 2:1, 3:1, 5:1, or 8:1, while the maximum molar ratio of $H_2S$ to carbon-carbon double bonds of the limonene can be 500:1, 150:1, 100:1, 50:1, 35:1, or 25:1. Therefore, suitable ranges for the ratio of $H_2S$ to carbon-carbon double bonds of the limonene can include, but are not limited to, the following ranges: from 2:1 to 500:1, from 2:1 to 150:1, from 2:1 to 50:1, from 2:1 to 25:1, from 3:1 to 100:1, from 3:1 to 50:1, from 3:1 to 35:1, from 5:1 to 500:1, from 5:1 to 100:1, from 5:1 to 35:1, from 5:1 to 25:1, from 8:1 to 500:1, from 8:1 to 150:1, from 8:1 to 50:1, from 8:1 to 35:1, or from 8:1 to 25:1.

Generally, without being limited to theory, an increase in the ratio of $H_2S$ to carbon-carbon double bonds can be used to increase the average thiol sulfur to sulfide sulfur molar ratio and/or the average thiol sulfur content of the sulfur-containing compounds in the polythiol compositions disclosed herein. In contrast, without being limited to theory, a decrease in the ratio of $H_2S$ to carbon-carbon double bonds generally can be used to increase the mercaptan equivalent weight and/or the average sulfide sulfur content of the sulfur-containing compounds in the polythiol compositions disclosed herein.

When the phosphite compound is used in the processes disclosed herein, the minimum molar ratio of the phosphite compound to carbon-carbon double bonds of the limonene can be 0.0005:1, 0.001:1, 0.005:1, or 0.006:1, while the maximum molar ratio of the phosphite compound to carbon-carbon double bonds of the limonene can be 0.1:1, 0.075:1, or 0.05:1. Therefore, suitable ranges for the molar ratio of the phosphite compound to carbon-carbon double bonds of the limonene can include, but are not limited to, the following: from 0.0005:1 to 0.1:1, from 0.0005:1 to 0.075:1, from 0.0005:1 to 0.05:1, from 0.001:1 to 0.1:1, from 0.001:1 to 0.075:1:1, from 0.001:1 to 0.05:1, from 0.005:1 to 0.1:1, from 0.005:1 to 0.05:1, from 0.006:1 to 0.001:1, from 0.006:1 to 0.05:1, from 0.008:1 to 0.05:1, from 0.008:1 to 0.04:1, from 0.01:1 to 0.1:1, or from 0.01:1 to 0.05:1.

Independently, steps 1 and 2 of the process for forming a polythiol composition can be conducted at a variety of temperatures, pressures, and time periods. For instance, the temperature at which the limonene, $H_2S$, and the phosphite compound (if used) are initially contacted can be the same as, or different from, the temperature at which the polythiol composition is formed. As an illustrative example, in step 1, the limonene, $H_2S$, and the phosphite compound (if used) can be contacted initially at temperature T1 and, after this initial combining, the temperature can be increased to a temperature T2 to allow the formation of the polythiol composition. Likewise, the pressure can be different in step 1 than in step 2. Often, the time period in step 1 is referred to as the contact time, while the time period in step 2 is referred to as the reaction time. The contact time and the reaction time can be different; alternatively, the contact time and the reaction time can be the same.

In an embodiment, step 1 of the process for forming a polythiol composition can be conducted at a temperature in a range from −30° C. to 150° C.; alternatively, from −20° C. to 130° C.; alternatively, from −10° C. to 100° C.; alternatively, from −5° C. to 80° C.; alternatively, from 0° C. to 60° C.; or alternatively, from 10° C. to 45° C. In these and other embodiments, after the initial contacting, the temperature can be changed, if desired, to another temperature for the formation of the polythiol composition. Accordingly, step 2 can be conducted at a temperature in a range from −30° C. to 150° C.; alternatively, from −20° C. to 130° C.; alternatively, from −10° C. to 100° C.; alternatively, from −5° C. to 80° C.; alternatively, from 0° C. to 60° C.; or alternatively, from 10° C. to 45° C. These temperature ranges also are meant to encompass circumstances where the forming step can be conducted at a series of different temperatures, instead of at a single fixed temperature, falling within the respective ranges.

In an embodiment, step 1 and/or step 2 of the process of forming a polythiol composition can be conducted at a total reactor pressure in a range from 30 to 1500 psig, such as, for example, from 50 to 1500 psig. In some embodiments, the polythiol formation in step 2 can be conducted at total reactor pressure in a range from 50 to 1500 psig; alternatively, from 50 to 1000 psig; alternatively, from 50 to 750 psig; alternatively, from 50 to 500 psig; or alternatively, from 100 to 500 psig.

The contact time in step 1 of the process is not limited to any particular range. That is, the limonene, $H_2S$, and the phosphite compound (if used) can be initially contacted rapidly, or over a longer period of time, before commencing the reaction and/or the formation of the polythiol composition in step 2. Hence, step 1 can be conducted, for example, in a time period ranging from as little as about 1-30 seconds to as long as about 1-6 hours. In some embodiments, the contact time can be in a range from 15 minutes to 3 hours, or from 30 minutes to 2 hours. The appropriate reaction time for the formation of the polythiol composition in step 2 can depend upon, for example, the reaction temperature and the molar ratios of the respective components in step 1, among other variables. However, the polythiol composition often can be formed over a time period in step 2 that can be in a range from 1 minute to 8 hours, such as, for example, from 2 minutes to 6 hours, from 5 minutes to 5 hours, from 10 minutes to 4 hours, or from 15 minutes to 3 hours.

In embodiments of this invention, once the limonene, $H_2S$, and the phosphite compound (if used) are contacted, the polythiol composition can be formed in the presence of electromagnetic radiation. For instance, the polythiol composition can be formed in the presence of ultraviolet light. Additionally or alternatively, the polythiol composition can be formed by light photolysis initiation of a free radical initiator. Additionally or alternatively, the polythiol composition can be formed under conditions suitable for the thermal decomposition of a free radical initiator. Additionally, a photoinitiator can be utilized in conjunction with ultraviolet light or light photolysis initiation of a free radical initiator. Free radicals, therefore, can be generated in situ by a suitable energy source, or can be generated by the thermal decomposition of a free radical initiator, or by a combination of these sources. The polythiol composition can be formed in the presence of free radicals from any one of aforementioned sources, including combinations thereof; but is not limited to free radicals generated only by these means.

In an embodiment, the step 1 contacting of the limonene, $H_2S$, and the phosphite compound (if used) can be conducted prior to the generation of free radicals and the formation of the polythiol composition in step 2.

When the polythiol composition is formed in the presence of ultraviolet light, ultraviolet light in the range, for example, from 172 to 450 nm, from 172 to 380 nm, or from 172 to 320 nm, can be employed. Ultraviolet light can be supplied from ultraviolet lamps, but other sources of ultraviolet light can be employed, and are to be considered within the scope of the present invention.

The free radical initiator can be any free radical initiator capable of forming free radicals under thermal decomposition or light photolysis. For example, the free radical initiator employed for the formation of the polythiol composition can comprise a —N═N— group, a —O—O— group, or combinations thereof; alternatively, a —N═N— group; or alternatively, a —O—O— group. Free radical initiators, therefore, can include, but are not limited to, peroxy compounds, organic azo compounds, or combinations thereof; alternatively, peroxy compounds; or alternatively, organic azo compounds. Peroxy compounds which can be utilized can include peroxides, hydroperoxides, peroxyesters, diacylperoxides, and percarbonates; alternatively, peroxides; alternatively, hydroperoxides; alternatively, peroxyesters; alternatively, diacylperoxides; or alternatively, percarbonates. In an embodiment, the peroxide can be a dialkyl peroxide. In an embodiment, the hydroperoxide can be an alkyl hydroperoxide. In an embodiment, the peroxy ester can be an alkyl peroxyalkanoate, or alternatively, an alkyl peroxyarenoate. In an embodiment, the diacylperoxide can be a diaroyl peroxide, or alternatively, a diakoyl peroxide. In an embodiment, the percarbonate can be a dihydrocarbyl percarbonate; alternatively, a diarylpercarbonate; or alternatively, a dialkylpercarbonate. Generally, the hydrocarbon and/or alkane group(s) utilized in any peroxy compound can be a $C_1$ to $C_{30}$, $C_2$ to $C_{18}$, $C_2$ to $C_{10}$, or $C_2$ to $C_5$ hydrocarbon and/or alkane group(s). Generally, the arene group utilized in any peroxy compound can be a $C_6$ to $C_{30}$, $C_6$ to $C_{18}$, $C_6$ to $C_{15}$, or $C_6$ to $C_{10}$ arene group(s). Illustrative non-limiting examples of peroxy compounds which can be utilized can include, but are not limited to, diisobutyryl peroxide, 1-(2-ethylhexanoylperoxy)-1,3-dimethylbutyl peroxypivalate, cumylperoxyneodecanoate, 1,1,3,3-tetramethylbutyl peroxyneodecanoate, t-butyl peroxyneodecanoate, 1,1,3,3-tetramethylbutyl peroxypivalate, t-butyl peroxyneoheptanoate, t-amyl peroxypivalate, t-butyl peroxypivalate, di(3,5,5-trimethylhexanoyl) peroxide, dilauroyl peroxide, didecanoyl peroxide, 2,5-dimethyl-2,5-di(2-ethylhexanoylperoxy) hexane, 1,1,3,3-tetramethylbutyl peroxy 2-ethylhexanoate, t-amyl peroxy 2-ethylhexanoate, dibenzoyl peroxide, acetyl peroxide t-butyl peroxy 2-ethylhexanoate, t-butyl peroctanoate, t-butyl peroxydiethylacetate, t-butyl peroxyisobutyrate, t-butyl peroxy 3,5,5-trimethylhexanoate, t-butyl peroxyacetate, t-butyl peoxybenzoate, 2,4-dichlorobenzoyl peroxide, t-butylpermaleic acid, di-t-butyl diperphthalate, di(4-t-butylcyclohexyl) peroxydicarbonate, di(2-ethylhexyl) peroxydicarbonate, dibutyl peroxydicarbonate, dicetyl peroxydicarbonate, dimyristyl peroxydicarbonate, t-amylperoxy 2-ethylhexyl carbonate, t-butylperoxy isopropyl carbonate, t-butylperoxy 2-ethylhexyl carbonate, 1,1-di(t-butylperoxy) 3,5,5-trimethylcyclohexane, 2,2-di(4,4-di(t-butylperoxy)cyclohexyl)propane, 1,1-di(t-butylperoxy) cyclohexane, 2,2-di(t-butylperoxy)butane, di(t-amyl) peroxide, dicumyl peroxide, di(t-butylperoxyisopropyl) benzene, 2,5-dimethyl-2,5-di(t-butylperoxy)hexane, t-butyl cumyl peroxide, 2,5-dimethyl-2,5-di(t-butylperoxy)hexyne-3, di-t-butyl peroxide, 3,6,9-triethyl-3,6,9-trimethyl-1,4,7-triperoxoane, t-butyl hydroperoxide, methyl benzyl hydroperoxide, octylperbenzoate, methyl ethyl ketone peroxide, acetone peroxide, or combinations thereof.

Non-limiting examples of suitable azo compounds include α,α'-azo diisobutyronitrile (AIBN), azobenzene, azomethane, 2,2'-azodi(2-methylbutyronitrile), 2,2'-azobis(4-methoxy-2,4-dimethyl valeronitrile), dimethyl 2,2'-azobis(2-methylpropionate), 1,1'-azobis(cyclohexane-1-carbonitrile), 1-[(cyano-1-methylethyl)azo] formamide, 2,2'-azobis(N-cyclohexyl-2-methylpropionamide), 2,2'-azobis (2,4-dimethyl valeronitrile), 2,2'-azobis(-methylbutyronitrile), 2,2'-azobis[N-(2-propenyl)-2-methylpropionamide], 2,2'-azobis(N-butyl-2-methylpropionamide), 2,2'-azobis {2-methyl-N-[1,1-bis(hydroxymethyl)-2-hydroxyethyl] propionamide, 2,2'-azobis[2-methyl-N-(2-hydroxyethyl)propionamide], 2,2'-azobis[2-(2-imidazolin-2-yl)propane], 2,2'-azobis{2-methyl-N-[2-(1-hydroxybutyl)] propionamide}, 2,2'-azobis (2-methylpropionitrile), 4,4'-azobis(4-cyanovaleric acid), 2,2'-azobis(2-methylpropane), 2,2'-azobis(2-methylpropionamidine)dihydrochloride, methylpropionitrile, azodicarboxamide, or combinations thereof.

Generally, the peroxide and azo compound free radical initiators that can be utilized in accordance with the present invention decompose under first order kinetics. Skilled artisans can readily find the first order kinetic parameters which can be utilized to describe the decomposition of a particular free radical catalyst from sources such as chemical suppliers, industry reference publications, and/or open literature publications. Under first order kinetics, the time required for a given fraction (or percentage) of the free radical initiator to decompose, at a specific temperature, into initiating species is independent of the concentration of the free radical. This phenomenon is often stated as a half-life; that is, the time in which one-half of the free radical initiator decomposes under specific conditions (e.g., temperature). According to the first order kinetics, the half-life of a free radical initiator is defined as the time it takes one-half of the initiator to decompose at a particular temperature. Using the available first order kinetic parameters for a particular free radical initiator, the concentration of the free radical initiator present in the reaction mixture can be determined at a particular time during the reaction based upon the knowledge of the amount of free radical initiator added to the reaction, the times at which additional (if any) free radical initiator is added to the reaction, and the temperature profile of the reaction.

When the polythiol composition is formed under conditions utilizing the thermal decomposition of a free radical initiator, the polythiol composition can be formed at a temperature within a temperature range of the 1 hour half-life of the free radical initiator. Alternatively, when the polythiol composition is formed under conditions utilizing the thermal decomposition of a free radical initiator, the polythiol composition can be formed using a free radical initiator having a half-life within a time range at the temperature utilized to form the polythiol composition. For example, step 2 of the process (the formation of the polythiol composition) can be conducted at a temperature within ±25° C. of the 1 hour half-life of the free radical initiator. In other embodiments, the polythiol composition can be formed at a temperature within ±20° C. of the 1 hour half-life of the free radical initiator; alternatively, at a temperature within ±15° C. of the 1 hour half-life of the free radical initiator; alternatively, at a temperature within ±10° C. of the 1 hour half-life of the free radical initiator. In another embodiment, the polythiol composition can be formed using a free radical initiator having a half-life within a range from 0.1 to 10 hours at the temperature the polythiol composition is formed (i.e., in step 2 of the process). Alternatively, the polythiol composition can be formed using a free radical initiator having a half-life ranging from 0.1 to 10 hours, from 0.25 to 4 hours, or from 0.5 to 2 hours, at the temperature the polythiol composition is formed. As above, in some embodiments of this invention, the polythiol composition can be formed at a temperature in a range from −30° C. to 150° C.; alternatively, from −20° C. to 130° C.; alternatively, from −10° C. to 100° C.; alternatively, from −5° C. to 80° C.; alternatively, from 0° C. to 60° C.; or alternatively, from 10° C. to 45° C.

Depending upon the particular free radical initiator, a free radical initiator can produce a different number of free radical reaction-initiating species per mole of free radical initiator; thus, the concentration of the free radical initiator can be stated in terms which describe the number of free radical reaction-initiating species generated per mole of free radical initiator. The term "equivalent" is often used to describe the number of reaction-initiating species produced per mole of free radical initiator. For example, one skilled in the art will readily recognize that di-t-butylperoxide can generate two free radical reaction-initiating species per mole of di-t-butylperoxide, while 2,5-bis(t-butylperoxy)-2,5-dimethylhexane can generate four free radical reaction-initiating species per mole of 2,5-bis(t-butylperoxy)-2,5-dimethylhexane.

In some embodiments, a photoinitiator can be utilized. Commercially available photoinitiators include, by way of example, Irgacure® 184 (1-hydroxy-cyclohexyl-phenyl-ketone), Irgacure® 500 (50% 1-hydroxy-cyclohexyl-phenyl-ketone and 50% benzophenone), Irgacure® 819 (Bis-(2,4,6-trimethylbenzoyl)-phenylphosphineoxide), and Irgacure® 127 (2-hydroxy-1-{4-[4-(2-hydroxy-2-methyl-propionyl)-benzyl]-phenyl}-2-methyl-propan-1-one), all available from Ciba Specialty Chemicals, and Duracure 1173 (2-hydroxy-2-methyl-1-phenyl-1-propanone).

When a free radical initiator is present in step 1 and/or in step 2 of the process, the weight percentage of the free radical initiator, based on the weight of the limonene, can be in a range from 0.05 to 10 wt. %, from 0.1 to 9 wt. %, from 0.2 to 5 wt. %, or from 0.1 to 2 wt. %. When a photoinitiator is present in step 1 and/or in step 2 of the process, the weight percentage of the photoinitiator, based on the weight of the limonene, can be less than or equal to 5 wt. %, less than or equal to 3 wt. %, less than or equal to 2 wt. %, or less than or equal to 1.5 wt. %, and typical non-limiting ranges can include from 0.01 to 5 wt. %, from 0.05 to 5 wt. %, from 0.5 to 3 wt. %, or from 1 to 4 wt. %. Other amounts of the free radical initiator and/or the photoinitiator can be employed depending on the specific process conditions used to form the polythiol composition (e.g., temperature, pressure, time) and the respective ratios of $H_2S$ to limonene and of phosphite compound to limonene, amongst other factors. It is contemplated that more than one free radical initiator, more than one photoinitiator, or combinations of free radical initiator(s) and photoinitiator(s), can be employed.

In an embodiment, the polythiol composition can be formed in the absence of a solvent. However, in other embodiments, the polythiol can be formed in the presence of a solvent. Typically, when used, the solvent can be present in an amount up to 1,000 wt. %, based on the weight of the limonene. Alternatively, the formation of the polythiol can be performed in the presence of a solvent in an amount up to 750 wt. %, up to 500 wt. %, up to 250 wt. %, up to 200 wt. %, up to 150 wt. %, or up to 100 wt. %. When a solvent is utilized, the minimum amount of solvent utilized can be at least 5 wt. %, at least 10 wt. %, at least 25 wt. %, at least 50 wt. %, or at least 75 wt. %, based on the weight of the limonene. Generally, the amount of solvent which can be utilized can range from any minimum amount of solvent disclosed herein to any maximum amount of solvent disclosed herein. In some non-limiting embodiments, the formation of the polythiol can be performed in the presence of a solvent in an amount of from 5 wt. % to 1,000 wt. %, from 10 wt. % to 750 wt. %, from 25 wt. % to 500 wt. %, from 50 wt. % to 250 wt. %, from 50 wt. % to 150 wt. %, or from 75 wt. % to 125 wt. %, based on the weight of the limonene. The solvent can be contacted with the limonene, $H_2S$, and the phosphite compound (if used) in step 1 of the process, and remain present during the formation of the polythiol composition. Alternatively, the solvent can be added after the initial contacting in step 1. Solvents which can be utilized as the solvent are described herein, and these solvents can be utilized without limitation in the processes described herein.

In the processes for producing a polythiol composition disclosed herein, it is contemplated that at least 60% of the carbon-carbon double bonds of the limonene can react to form a sulfur-containing group in the polythiol composition. Often, at least 65% of the carbon-carbon double bonds of the limonene can react to form a sulfur-containing group; alternatively, at least 70%; alternatively; at least 75%; alternatively, at least 80%; alternatively, at least 85%; alternatively, at least 90%; alternatively, at least 95%; alternatively, at least 98%; or alternatively, at least 99%.

Once formed, the polythiol composition, or specific fractions of the polythiol composition, can be purified and/or isolated and/or separated using suitable techniques which include, but are not limited to, evaporation, distillation, crystallization, extraction, washing, decanting, filtering, drying, including combinations of more than one of these techniques. In one embodiment, the process for producing a polythiol composition can further comprise a step of separating or removing at least a portion of the $H_2S$, of the phosphite compound (if used), of the limonene, of compounds having only one sulfur atom (monosulfur compounds), or any combination thereof, from the polythiol composition. For instance, these materials can be separated or removed by distillation, by short path distillation, by wiped film evaporation, or by a combination of these techniques.

Consistent with embodiments of this invention, these processes for producing polythiol compositions can be used to produce any of the polythiol compositions disclosed herein.

Phosphite Compounds

Generally, the phosphite compound employed in certain processes for forming a polythiol composition disclosed herein can comprise, consist essentially of, or consist of, a compound having the formula:

$P(OR^1)_3$.

In this formula, each $R^1$ independently can be a $C_1$-$C_{18}$ hydrocarbyl group; alternatively, a $C_1$-$C_{10}$ hydrocarbyl group; alternatively, a $C_1$-$C_5$ hydrocarbyl group; alternatively, a $C_1$-$C_{18}$ alkyl group; alternatively, a $C_1$-$C_{10}$ alkyl group; alternatively, a $C_1$-$C_5$ alkyl group; alternatively, a $C_6$-$C_{18}$ aryl group; or alternatively, a $C_6$-$C_{10}$ aryl group. Accordingly, each $R^1$ independently can be a methyl group, an ethyl group, a propyl group, a butyl group, a pentyl group, a hexyl group, a heptyl group, an octyl group, a nonyl group, or a decyl group; alternatively, $R^1$ can be a methyl group, an ethyl group, a propyl group, a butyl group, or a pentyl group; alternatively, $R^1$ can be a methyl group; alternatively, $R^1$ can be an ethyl group; alternatively, $R^1$ can be a propyl group; alternatively, $R^1$ can be a butyl group; alternatively, $R^1$ can be a pentyl group; alternatively, $R^1$ can be a hexyl group; alternatively, $R^1$ can be a heptyl group; alternatively, $R^1$ can be an octyl group; alternatively, $R^1$ can be a nonyl group; or alternatively, $R^1$ can be a decyl group. In some embodiments, each $R^1$ independently can be a phenyl group, a tolyl group, a xylyl group, or a naphthyl group; alternatively, a phenyl group, a tolyl group, or a xylyl group; alternatively, a phenyl group; alternatively, a tolyl group; alternatively, a xylyl group; or alternatively, a naphthyl group.

In accordance with an embodiment of this invention, the phosphite compound can comprise, consist essentially of, or consist of, a trialkylphosphite, or alternatively, a triarylphosphite. In accordance with another embodiment of this invention, the phosphite compound can comprise, consist essentially of, or consist of, trimethylphosphite, triethylphosphite, tributylphosphite, or combinations thereof. Yet, in accordance with another embodiment of this invention, the phosphite compound can comprise trimethylphosphite; alternatively, triethylphosphite; or alternatively, tributylphosphite. In another embodiment, the phosphite compound can comprise, consist essentially of, or consist of, triphenylphosphite.

Solvents

As described herein, the polythiol composition can be formed in the presence of a solvent. The solvent can comprise, consist essentially of, or consist of, a hydrocarbon, an aromatic hydrocarbon, a ketone, an alcohol, an ether, or combinations thereof. Hence, mixtures and/or combinations of solvents can be utilized in the processes of forming polythiol compositions disclosed herein.

In an embodiment, the solvent employed in forming the polythiol composition can comprise, consist essentially of, or consist of, a hydrocarbon solvent. Suitable hydrocarbon solvents can include, for example, aliphatic hydrocarbons, petroleum distillates, or combinations thereof. Aliphatic hydrocarbons which can be useful as the solvent include $C_3$ to $C_{20}$ aliphatic hydrocarbons; alternatively, $C_4$ to $C_{15}$ aliphatic hydrocarbons; or alternatively, $C_5$ to $C_{10}$ aliphatic hydrocarbons. The aliphatic hydrocarbons can be cyclic or acyclic, and/or can be linear or branched, unless otherwise specified.

Non-limiting examples of suitable acyclic aliphatic hydrocarbon solvents that can be utilized singly or in any combination include pentane (n-pentane or a mixture of linear and branched $C_5$ acyclic aliphatic hydrocarbons), hexane (n-hexane or a mixture of linear and branched $C_6$ acyclic aliphatic hydrocarbons), heptane (n-heptane or a mixture of linear and branched $C_7$ acyclic aliphatic hydrocarbons), octane (n-octane or a mixture of linear and branched $C_8$ acyclic aliphatic hydrocarbons), decane (n-decane or a mixture of linear and branched $C_{10}$ acyclic aliphatic hydrocarbons), and combinations thereof; alternatively, pentane (n-pentane or a mixture of linear and branched $C_5$ acyclic aliphatic hydrocarbons), hexane (n-hexane or a mixture of linear and branched $C_6$ acyclic aliphatic hydrocarbons), heptane (n-heptane or a mixture of linear and branched $C_7$ acyclic aliphatic hydrocarbons), octane (n-octane or a mixture of linear and branched $C_8$ acyclic aliphatic hydrocarbons), and combinations thereof; alternatively, hexane (n-hexane or a mixture of linear and branched $C_6$ acyclic aliphatic hydrocarbons), heptane (n-heptane or a mixture of linear and branched $C_7$ acyclic aliphatic hydrocarbons), octane (n-octane or a mixture of linear and branched $C_8$ acyclic aliphatic hydrocarbons), and combinations thereof; alternatively, pentane (n-pentane or a mixture of linear and branched $C_5$ acyclic aliphatic hydrocarbons); alternatively, hexane (n-hexane or a mixture of linear and branched $C_6$ acyclic aliphatic hydrocarbons); alternatively, heptane (n-heptane or a mixture of linear and branched $C_7$ acyclic aliphatic hydrocarbons); or alternatively, octane (n-octane or a mixture of linear and branched $C_8$ acyclic aliphatic hydrocarbons).

In an embodiment, the solvent employed in forming the polythiol composition can comprise, consist essentially of, or consist of, an aromatic hydrocarbon solvent. Aromatic hydrocarbons can include $C_6$ to $C_{30}$ aromatic hydrocarbons; alternatively, $C_6$ to $C_{20}$ aromatic hydrocarbons; or alternatively, $C_6$ to $C_{10}$ aromatic hydrocarbons. Non-limiting examples of suitable aromatic hydrocarbons that can be utilized singly or in any combination include benzene, toluene, xylene (including ortho-xylene, meta-xylene, para-xylene, or mixtures thereof), and ethylbenzene, or combinations thereof; alternatively, benzene; alternatively, toluene; alternatively, xylene (including ortho-xylene, meta-xylene, para-xylene or mixtures thereof); or alternatively, ethylbenzene.

In an embodiment, the solvent employed in forming the polythiol composition can comprise, consist essentially of, or consist of, a ketone solvent, an alcohol solvent, an ether solvent, or combinations thereof; alternatively, a ketone solvent; alternatively, an alcohol solvent; or alternatively, an ether solvent. Suitable ketones, alcohols, or ethers include $C_2$ to $C_{20}$ ketones, alcohols, or ethers; alternatively, $C_2$ to $C_{10}$ ketones, alcohols, or ethers; or alternatively, $C_2$ to $C_5$ ketones, alcohols, or ethers. Non-limiting examples of suitable ketone solvents can include acetone, ethyl methyl ketone, and combinations thereof. Non-limiting examples of suitable alcohol solvents can include methanol, ethanol, propanol, isopropanol, n-butanol, isobutanol, pentanol, hexanol, heptanol, octanol, benzyl alcohol, phenol, cyclohexanol, or combinations thereof. Suitable ether solvents can be cyclic or acyclic, non-limiting examples of which can include dimethyl ether, diethyl ether, methyl ethyl ether, monoethers or diethers of glycols (e.g., dimethyl glycol ether), furans, substituted furans, dihydrofuran, substituted dihydrofurans, tetrahydrofuran (THF), substituted tetrahydrofurans, tetrahydropyrans, substituted tetrahydropyrans, 1,3-dioxanes, substituted 1,3-dioxanes, 1,4-dioxanes, substituted 1,4-dioxanes, or mixtures thereof. In an embodiment, each substituent of a substituted furan, substituted dihydrofuran, substituted tetrahydrofuran, substituted tetrahydropyran, substituted 1,3-dioxane, or substituted 1,4-dioxane, can be a $C_1$ to $C_5$ alkyl group.

Mining Chemical Collectors

Embodiments of this invention also are directed to collector compositions (such as mining chemical collector compositions) that comprise any of the polythiol compositions disclosed herein. Unexpectedly, it was found that the polythiol compositions disclosed herein are very effective at removing certain desirable metals from mining ores.

In one embodiment, a collector composition of this invention can comprise water and any of the polythiol compositions disclosed herein. Often, the amount of water in the collector composition can be greater than 75 wt. %, greater than 95 wt. %, or greater than 99 wt. %, and typical non-limiting ranges include from 75 to 99.99 wt. %, from 95 to 99.99 wt. %, or from 99 to 99.99 wt. % water, based on the total weight of the collector composition. The amount of the polythiol composition present in the collector composition typically can be less than 0.1 wt. %, less than 0.01 wt. %, or less than 0.001 wt. %.

In another embodiment, the collector composition of this invention can comprise any of the polythiol compositions disclosed herein and a suitable pH control agent. Illustrative pH control agents can include, but are not limited to, lime, carbonate compounds, and the like, as well as combinations thereof. In yet another embodiment, the collector composition can comprise any of the polythiol compositions disclosed herein and a suitable frothing agent. Illustrative frothing agents can include, but are not limited to, pine oil; alcohols such as methyl isobutyl carbinol (MIBC); and polyether alcohols such as NALFLOTE® 9837 and Cytec OREPREP® X-133. Combinations of more than one frothing agent can be used. In still another embodiment, the collector composition can comprise any of the polythiol compositions disclosed herein, a frothing agent, a pH control agent, and water.

Collector compositions consistent with this invention can comprise a polythiol composition and can contain other components—such as frothing agents, pH control agents, water, and others—and these compositions can be contacted with an ore, as described further hereinbelow. Any suitable order of contacting any components of the collector composition with the ore can be used; and such collector compositions, whether solutions, slurries, blends, immiscible mixtures (e.g., in some instances, the polythiol composition is not soluble/miscible in water), and so forth, are encompassed herein. For instance, a ground ore can be contacted with, in any order, a polythiol composition, a frothing agent, a pH control agent, and a first amount of water (which can be relatively small), resulting in a slurry of the ore and a collector composition comprising the polythiol composition, the frothing agent, the pH control agent, and water. In some embodiments, a second amount of water (which can be relatively large) can be added to this slurry prior to the flotation process, resulting in a slurry of the ore in a collector composition comprising lower concentrations of the polythiol composition, the frothing agent, and the pH control agent. Other suitable methods and orders of forming the collector compositions, whether in the presence of the ore or not, would be readily recognized by those of skill in the art, and such are encompassed herein.

Moreover, the polythiol compositions disclosed herein can be used alone or in combination with other suitable (second) collector agents. Thus, any of the collector compositions can further comprise a second collector agent, non-limiting examples of which can include a xanthate, a xanthic ester, a thionocarbonate, a dialkyl dithiophosphate, and the like, as well as combinations thereof.

Also provided herein are flotation processes for the recovery of metals from ores. The metal can be recovered in any form, for instance, a metal-containing compound (e.g., copper sulfides, molybdenum sulfides), a metal ion, or elemental metal, as well as combinations thereof. One such flotation process for the recovery of a metal from an ore can comprise contacting the ore with any of the collector compositions disclosed herein (or any of the polythiol compositions disclosed herein). Equipment and techniques for the flotation recovery of various metals from mining ores are well known to those of skill in the art, and are illustrated representatively herein in the examples that follow.

Generally, the metal recovered from the ore comprises a transition metal, one or more Group 3-12 metals. In some embodiments, the metal can comprise a Group 3-11 transition metal, or a Group 5-12 transition metal, while in other embodiments, the metal can comprise gold, silver, platinum, copper, nickel, iron, lead, zinc, molybdenum, cobalt, or chromium, as well as combinations thereof. In particular embodiments of this invention, the metal can comprise copper and molybdenum; alternatively, copper; or alternatively, molybdenum. In addition, other transition metals, such as iron, can be recovered along with copper and/or molybdenum.

The flotation processes and mining chemical collector compositions described herein are not limited to any particular ore. However, the effectiveness of such processes and compositions are particularly beneficial when the ore comprises a copper-bearing ore, a molybdenum-bearing ore, or a copper-bearing and molybdenum-bearing ore. Illustrative and non-limiting examples of such ores include chalcopyrite, chalcocite, and the like.

Any suitable amount of the collector composition and/or the polythiol composition can be used in the flotation recovery processes. Often, but not limited thereto, the polythiol composition and the ore are contacted at a weight ratio in a range from about 0.001 lb of the polythiol composition per ton of ore to about 5 lb of the polythiol composition per ton of ore, or from about 0.01 lb of the polythiol composition per ton of ore to about 1 lb of the polythiol composition per ton of ore.

Unexpectedly, the polythiol compositions disclosed herein, and any resultant collector compositions containing the polythiol compositions, have high recovery rates of certain transition metals. For example, the % recovery of copper in the flotation process can be at least about 75 wt. %, at least about 80 wt. %, at least about 85 wt. %, or at least about 90 wt. %, and often as high as 95-98 wt. %. Similarly, the % recovery of molybdenum in the flotation process can be at least about 60 wt. %, at least about 65 wt. %, at least about 80 wt. %, at least about 85 wt. %, or at least about 90 wt. %, and often as high as 92-97 wt. %.

Furthermore and surprisingly, in some embodiments, the % recovery of copper, the % recovery of molybdenum, or the % recovery of copper and molybdenum, can be greater than that of a mine standard, under the same flotation conditions. As would be recognized by those of skill in the art, a mine standard is the prevailing collector composition currently being used for a given ore and/or desired transition metal. Mine standards are discussed in greater detail in the examples that follow. In some embodiments, the % recovery of copper, the % recovery of molybdenum, or the % recovery of copper and molybdenum, can be within about 5 wt. %, within about 3 wt. %, within about 2 wt. %, or within about 1 wt. %, of the mine standard, under the same flotation conditions.

Additionally or alternatively, the % recovery of copper, the % recovery of molybdenum, or the % recovery of copper and molybdenum, can be greater than that of a mining collector composition containing TDDM (tertiary dodecyl mercaptan) or NDDM (n-dodecyl mercaptan), under the same flotation conditions. Thus, in some instances, the polythiol compositions disclosed herein are superior to TDDM and/or NDDM. In other embodiments, the % recovery of copper, the % recovery of molybdenum, or the % recovery of copper and molybdenum, can be within about 5 wt. %, within about 3 wt. %, within about 2 wt. %, or within about 1 wt. %, of that achieved with TDDM and/or that achieved with NDDM, under the same flotation conditions.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Product composition information based upon GC-FID data is presented in area percentages, unless otherwise specified. GC-FID analysis was performed on an Agilent® 7890 gas chromatograph using a 2 m×0.25 mm×1.0 µm film DB-1 capillary column with Flame Ionization Detector using helium as the carrier gas. A sample of the product composition was dissolved in acetone at a 3:1 acetone to product sample ratio and 0.4 µL of the diluted sample product was injected into a split/splitless PVT inlet. The GC inlet parameters were an inlet temperature of 275° C., an initial inlet pressure of 2.4 psi, a final inlet pressure of 5.2 psi, constant flow conditions of 2 mL/minute of helium, and an inlet split ratio of 50:1. The temperature program for the GC-FID analysis was an initial temperature of 70° C. for 2 minutes, followed by a temperature ramp of 8° C./minute to 200° C., followed by a temperature ramp of 15° C./minute to 300° C. and a temperature hold at 300° C. for 10 minutes. The GC-FID detector was operated at a temperature of 300° C. having a hydrogen gas flow of 25 mL/minute, an air flow of 300 mL/minute, and a makeup helium gas flow of 25 mL/minute. GC-FID analysis data was acquired with Agilent Chemstation®.

Weight percentage of thiol sulfur (wt. % SH) was determined by iodine titration, and weight percentage of total sulfur (wt. % Total S) was determined by x-ray analysis. Mercaptan equivalent weight (SHEW) is equal to the average molecular weight (g/mol) of the mercaptan divided by the number of SH functionality present in the mercaptan molecule, and can be calculated as follows: SHEW=(32.06 grams mercaptan sulfur/equivalent)/(wt. % SH/100), where wt. % SH=grams thiol sulfur (or mercaptan sulfur) per gram of the polythiol composition.

Raman spectroscopy was performed with a Kaiser Optical System $R_{XN}2$ spectrometer and by observing certain wavenumber ranges for olefin conversion, such as vinylidene olefin at 1644 $cm^{-1}$ and cyclohexene ring olefin at 1676 $cm^{-1}$.

Samples were analyzed for molybdenum content by digesting an ore sample over heat in a solution containing potassium chlorate, nitric acid, and hydrochloric acid. After the digested sample was cooled, super floc was added, and the sample was analyzed via atomic absorption using a nitrous oxide-acetylene red flame. Standards ranged from 50-100 ppm by weight molybdenum. A similar procedure with the necessary modifications was used to analyze for copper and iron content.

Table I summarizes calculated product characteristics for polythiol compounds derived from limonene. In Table I, N is the number of substituted cyclohexyl moieties, —SH is the number of thiol groups, —S— is the number of sulfide groups, Total S is the total number of sulfurs, MW is the molecular weight of the polythiol compound (g/mol), % SH is the wt. % thiol sulfur, % Sulfide is the wt. % sulfide sulfur, % Total S is the wt. % sulfur, Ratio SH/S is the ratio of thiol sulfur to sulfide sulfur, and SHEW is the mercaptan equivalent weight.

Table II summarizes calculated product characteristics for illustrative polythiol compositions derived from limonene. In Table II, N is the number of substituted cyclohexyl moieties, % SH is the wt. % thiol sulfur of the composition, % Sulfide is the wt. % sulfide sulfur of the composition, % Total S is the wt. % sulfur of the composition, Ratio SH/S is the ratio of thiol sulfur to sulfide sulfur of the composition, and SHEW is the mercaptan equivalent weight of the composition. The first entry is high purity dipentene dimercaptans, while the other compositions illustrate the impact of intermolecular sulfide compounds (heavies, N=2 and above) on the product features of the polythiol compositions.

Examples 1-8

Polythiol Compositions Produced from Limonene

A 1.5-L ultraviolet light reactor was used for Examples 1-8; the working volume was 1.2 L. The stainless-steel reactor had a quartz lamp well mounted horizontal to an off-set stir shaft. The reactor was equipped with a thermowell, cooling coils, a charge port, a sample port, and a bottom drain valve. To the 1.5-L reactor, the limonene, the phosphite compound (triethylphosphite (TEP), if used), and the photoinitiator (Irgacure 500, if used) were charged to the reactor through the charge port. The reactor was sealed and pressure checked with nitrogen at 450 psig. The reactor was vented and the desired amount of $H_2S$ was charged to the reactor. The reactor contents were heated and controlled by setting the external circulating bath at the desired temperature of about 25-30° C. for UV-initiated Examples 1 to 8. The operating pressure ranged from about 300 to 450 psig.

The reaction mixture was allowed to mix for 15 to 30 minutes. After this mixing period, the ultraviolet lamp was turned on, and the olefin conversion to a sulfur-containing group was monitored by observing olefin peaks using Raman Spectroscopy. The ultraviolet lamp typically required 3-5 minutes to reach full power. The ultraviolet lamp power was 100 watts.

When the conversion of carbon-carbon double bonds was complete or the desired reaction time was reached, the ultraviolet lamp was turned off. The $H_2S$ was then slowly vented from the reactor. The reaction product was placed in a rotoevaporator at 60° C. and low vacuum to remove additional residual $H_2S$. The crude polythiol compositions of Examples 1-8 were analyzed using gas chromatography (GC) and data presented in area percentages, unless otherwise specified. GC analysis of the sulfur-containing compounds excluded peaks attributed to phosphorus-containing materials.

Table III summarizes certain process conditions and analytical results for the polythiol compositions of Examples 1-8. In Table III, the $H_2S$:olefin molar ratio was 15:1, the time (minutes) was the total time in the reactor, the % conversion (Raman) was the conversion of olefin groups to sulfur-containing groups. For the GC analysis (area %), ene was the amount of compounds with residual olefin (e.g., dipentene, mono-ene impurities), mono-S was the amount of compounds with only one sulfur, DPDM was the amount of dipentene dimercaptan compounds, and heavies was the amount of compounds with at least one thiol sulfur (typically, two) and at least one sulfide sulfur group. The limonene source for Examples 1-2 was a food-grade limonene from Treatt. The limonene source for Examples 3-8 was from Orange Terpenes, either lot 1 or lot 2. No noticeable difference between limonene starting materials was noted.

The results from Table III indicate that without the phosphite compound, the conversion of limonene was low and the reaction time was long. When both phosphite and photoinitiator were used, the reaction time was 15-20 minutes with acceptable conversion. Examples 1-8 produced polythiol compositions containing about 72-90% DPDM and about 4-8% heavies.

Examples 9-16

Polythiol Compositions Produced from Limonene

A 5-L ultraviolet light reactor was used for Examples 9-16; the working volume was 4 L. The stainless-steel reactor had a quartz lamp well mounted horizontal to an off-set stir shaft. The reactor was equipped with a thermowell, cooling coils, a charge port, a sample port, and a bottom drain valve. To the 5-L reactor, the limonene, the phosphite compound (tributylphosphite (TBP), if used), and the photoinitiator (Irgacure 500, if used) were charged to the reactor through the charge port. The reactor was sealed and pressure checked with nitrogen at 450 psig. The reactor was vented and the desired amount of $H_2S$ was charged to the reactor. The reactor contents were heated and controlled by setting the external circulating bath at the desired temperature of about 25-30° C. for UV-initiated Examples 9-16. The reaction pressure was 300-450 psig.

The reaction mixture was allowed to mix for 15 to 30 minutes. After this mixing period, the ultraviolet lamp was turned on, and the olefin conversion to a sulfur-containing group was monitored by observing olefin peaks using Raman Spectroscopy. The ultraviolet lamp typically required 3-5 minutes to reach full power. The ultraviolet lamp power was 100 watts.

When the conversion of carbon-carbon double bonds was complete or the desired reaction time was reached, the ultraviolet lamp was turned off. The $H_2S$ was then slowly vented from the reactor. The reaction product was placed in a rotoevaporator at 60° C. and low vacuum to remove additional residual $H_2S$. The crude polythiol compositions of Examples 9-16 were analyzed using gas chromatography (GC) and data presented in area percentages, unless otherwise specified. GC analysis of the sulfur-containing compounds excluded peaks attributed to phosphorus-containing materials.

Table IV summarizes certain process conditions and analytical results for the polythiol compositions of Examples 9-16. Table IV indicates that excellent conversion was achieved when either sufficient amounts of the phosphite compound were used, or both phosphite and photoinitiator were used. Examples 9-16 produced polythiol compositions containing about 76-90% DPDM and about 5-9% heavies, and characterized by about 28-31 wt. % total sulfur.

Examples 17-24

Polythiol Compositions Produced from Limonene

Examples 17-24 were performed in substantially the same manner as that of Examples 9-16. Table V summarizes certain process conditions and analytical results for the polythiol compositions of Examples 17-24. Some of the experiments from Examples 9-16 and Table IV are also listed in Table V and renumbered for ease of comparison. Examples 17-24 produced polythiol compositions containing about 76-90% DPDM and about 5-10% heavies, and characterized by about 28-30 wt. % total sulfur.

Examples 25-29

Polythiol Compositions Produced from Limonene Before and after Distillation

A 379-L (100-gallon) ultraviolet light reactor was used for Examples 25-29; working volume was 80 gallons. The 379-L reactor had a vessel with an internal heating/cooling coil, a quartz lamp and lamp well mounted vertically in an external pipe, and a pump to circulate the fluid the contents from the vessel, into and through the pipe, and back to the vessel. To the vessel, the limonene (28.4 kg) and the phosphite compound (if used, 140 g) were charged to the vessel and then $H_2S$ (212.5 kg) was added. The pump was turned on, and the reactor contents were mixed and circulated for about 15 minutes. After this mixing period, the ultraviolet lamp was turned on, and the olefin conversion to a sulfur-containing group was monitored by observing olefin peaks using Raman spectroscopy. The ultraviolet lamp typically required 3-5 minutes to reach full power. The ultraviolet lamp power was 2.5-7.5 kW. The reaction temperature was in the 25-30° C. range for UV-initiated Examples 25A-27A, and the operating pressure was in the 260-430 psig range. The lamp power was varied to settings of 2.5 kW, 5 kW, or 7.5 kW during the run to maintain acceptable reactor pressures. For a 30-minute period in the middle of Example 25, the lamp was turned off.

When the conversion of carbon-carbon double bonds was complete or the desired reaction time was reached, the ultraviolet lamp was turned off. The $H_2S$ was then slowly and safely vented from the reactor. The reaction product was placed in a rotoevaporator at 60° C. and low vacuum to safely remove additional residual $H_2S$. The crude polythiol compositions of Examples 25A-27A and distilled polythiol compositions of Examples 25B-26B and 28B-29B were analyzed using gas chromatography (GC) and data presented in area percentages, unless otherwise specified. GC analysis of the sulfur-containing compounds excluded peaks attributed to phosphorus-containing materials.

Table VI summarizes certain process conditions and analytical results for the polythiol compositions of Examples 25-29. Table VI indicates that excellent conversion was achieved for Examples 25A-27A, resulting in crude polythiol compositions containing about 0.8-1% ene, about 2-4% mono-S, about 87-89% DPDM, and about 7-9% heavies.

The crude polythiol compositions of Example 25A and 26A were subjected, independently, to laboratory distillation in four smaller batches. The distillation conditions were a pressure of 9 torr, a kettle temperature at reflux in the 127-153° C. range, a head temperature at reflux in the 24-42° C. range, a final kettle temperature in the 162-180° C. range, and a final overhead temperature in the 108-152° C. range. The resultant four distillation (kettle) samples were recombined to form the composite 25B and 26B samples, respectively. As shown in Table VI, the distillation process removed virtually all of the ene and virtually all of the mono-S products, resulting in distilled polythiol compositions 25B-26B containing zero ene, less than 0.1% mono-S, about 89-91% DPDM, and about 9-11% heavies. It is believed that due to the removal of the lighter fractions, the distilled products had no offensive odor. While not wishing to be bound by the following theory, it is believed that further advancement to sulfide heavies may be occurring in the distillation process, in addition to simply removing the lighter fraction from the crude polythiol composition.

Additional distillation experiments were performed on a polythiol composition produced similarly to Examples 25A-27A. Example 28B was produced at 9-10 torr, while Example 29B was produced at 21 torr. As shown in Table VI, the distilled polythiol compositions of Examples 28B-29B containing zero ene, less than 1% mono-S, about 90% DPDM, and about 9-10% heavies.

Examples 30-37

Flotation Recovery of Mining Chemicals

The procedures for the evaluation of different ores and the flotation recovery of various metals are different, but each generally starts with a grind size determination to determine the desired grind time to give a sample with the correct particle size distribution according to the US Standard mesh scale. An appropriate amount of ore from the appropriate mine (900 to 1000 grams, depending on the ore) was provided at the −10 mesh size. This ore was placed in a rod mill with 20 lb of rods with prescribed sizes, and an appropriate amount of water was added to give the desired solids content. The rod mill was turned on for the desired amount of time. This time was based on prior knowledge of that ore sample or an educated guess based on experience of similar ore materials. After grinding for the desired amount of time, the sample was poured and rinsed with a minimum amount of tap water into a container. The water and solids were poured through a 230 mesh wet screen sieve shaker while washing with water to remove any fines. This was done in two batches to facilitate the washing procedure. Failure to remove the fines often can result in the material being glued together in chunks, analogous to concrete. The remaining solids were removed from the screen with washing onto filter paper in a Buchner funnel with vacuum. The solids collected were dried in an oven overnight at 75° C. The dried solids were then screened through a series of screens (25 mesh, 40, 50, 70, 100, 140, 200, 230, and Pan) on a Ro-Tap® shaker in two batches, six minutes each. A total of three or more grind experiments were required to bracket the desired grind time and give a graph of time vs. wt. % dry solids on a certain mesh screen size.

For example, the grind size was 30 wt. %+100 mesh solids (meaning 30% of the particles are 149 microns or larger) for Ore 1, 36 wt. %+100 mesh solids (meaning 36% of the particles are 149 microns or larger) for Ore 3, 20 wt. %+100 mesh solids (meaning 20% of the particles are 149 microns or larger) for Ore 4, and 25 wt. %+70 mesh solids (meaning 25% of the particles are larger than 210 microns) for Ore 2. The +100 means everything collected on the 100 screen and larger (such as 25, 40, etc.). From the linear plot of this data, the ideal grind time was determined by adding the amount of solids on the screens up to the desired mesh size. From the plot of this data, the desired grind time was read. This procedure can be done periodically, but is necessary if the ore type or the rod charge changes.

The compositions of each ore evaluated herein are summarized in Table VII. Values are shown in wt. % for copper, iron, molybdenum, sulfur, and total insolubles.

The standard flotation procedure for Ore 1 chalcopyrite is as follows. A 1-kg charge of Ore 1 was added to a rod mill along with 650 mL tap water and approximately 1 g of lime (this amount can be adjusted to obtain the desired alkalinity, see below). The flotation collector reagents were added to the pool of water (not directly on the solids) in the mill using micro syringes: PAX (potassium amyl xanthate), 0.01 lb/ton @ 1% solution (1000 μL), made fresh daily; medium cycle oil (MCO), 0.05 lb/ton, 24.6 μL; MC 37 collector (mixture of TDDM and MCO), 0.05 lb/ton (26.1 μL); and plant frother (80% Nalco NALFLOTE® 9837/20% Cytec OREPREP® X-133), 28 μL. The mill was placed on rubber rollers and ground for the predetermined time. The mill was removed from the rollers and the solids washed into a transparent plastic flotation cell (2.5 L). Only enough water was used to reach the flotation volume (2-liter mark on flotation cell). If too little water was used to wash the material into the flotation cell, additional lime water was added to reach the 2-liter flotation volume. The solids amount was about 32 wt. % for Ore 1. The material was conditioned for two min at 1200 rpm, then floated for five min at 1200 rpm. Air was bubbled into solution at the rate of 8 L/min. Froth was removed from the surface of the cell approximately every 10 sec with a plastic paddle. The froth was collected in a glass pan under the lip of the cell. Liquid was added periodically to keep the solution near the lip of the cell so froth could be easily removed. Care was taken to not have froth flow over the lip without raking with the paddle. The standpipe and back cell corners were washed down as needed with lime water. Depending on the frothiness of the ore, it may be necessary to restrict the air at the beginning of the flotation to prevent froth from overflowing the cell on its own. Generally, the air valve was completely open by the end of the first minute. If not, then the amount of frother was adjusted. If it was difficult to maintain complete surface coverage with froth, a few more microliters of frothing agent were added. To do this, the air and timer were shut off, the froth concentrate added and conditioned for 30 sec before turning back on the air and timer.

The air and stirring were turned off and the apparatus washed to remove solids from the stirrer and shaft into the flotation cell. After allowing the solids to settle for a few minutes, a sample was taken for titration to determine alkalinity. The remaining tails were filtered through an 8 inch stainless steel filter (3 gal) onto shark skin filter paper. The collected solids were dried in an oven at 85° C. overnight to give dry solids that were weighed and labeled as tailings.

The rougher froth concentrate collected in the pan was filtered by washing onto filter paper and dried in an oven at 85° C. overnight. Temperature was kept at/below 85° C. to prevent oxidation and weight changes from occurring. The dried solids were weighed and labeled as concentrate. Both the tailings and concentrate were analyzed for determination of copper, molybdenum, and iron.

The alkalinity titration procedure defined an alkalinity of 1.0 as being equivalent to 0.01 lb of CaO per ton of solution. To prepare lime water of 30 alkalinity, 19 g of CaO were added to 50 L of water, agitated for at least one hour, then solids were settled overnight. The lime water was decanted for use. For titration, to a 50 mL alkaline solution, one drop of phenolphthalein indicator solution was added, and titrated with 0.02N $H_2SO_4$ solution until the pink color disappeared. Each mL of titrating solution equaled 2.0 alkalinity units.

Assuming a solution is 30 alkalinity, that is, 0.3 lb CaO per ton of solution, then, (0.3 lb CaO/ton solution)*(ton/2000 lb)*(8.345 lb/gal)*(gal/3.785 L)*(453.6 g/lb) converts to 0.15 g CaO/L, or 0.0075 g CaO/50 mL.

If the molecular weight of CaO=56 g/mol, and the molecular weight of $H_2SO_4$=98 g/mol, and N=(Molarity)*(net positive charge), then $$0.02 N H_2SO_4 = (0.02/2)*(98 \text{ g/mol}) = (0.98 \text{ g/L})*(1 \text{ L}/1000 \text{ mL}) = 0.00098 \text{ g/mL}.$$

According to the stoichiometry of the reaction:

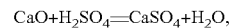

$$CaO + H_2SO_4 = CaSO_4 + H_2O,$$

then 98 g $H_2SO_4$ neutralizes 56 g CaO.

If 0.0075 g CaO are present, then 0.0075×98/56=0.013125 gm $H_2SO_4$ are required, and 0.013125 g $H_2SO_4$/0.00098 g/mL=13.393 mL $H_2SO_4$.

The standard flotation procedure for Ore 2 is as follows. The grind size was determined as described hereinabove for Ore 1. The optimum grind time was 9 min. One kg bag of ore was charged and 650 mL of water was added to the rod mill. The flotation procedure was carried out as described for the Ore 1, except a time of 9 min was used for the new ore and 12 min 18 sec for the old ore. The standard collector system for this ore was added to the grind: 14 μL of Cytec AERO® MX 7021 and 12.5 μL of Cytec AERO® XD 5002—both of which are modified thionocarbamates. The frother added in the flotation cell was Cytec OREPREP® X-133 at 5.6 μL dosage. The pH was adjusted to 11 with lime and the mixer was started at 1200 rpm for 1 min during the conditioning phase. The air was started and the froth was scraped for 6 min into one pan. The air was turned off and the final pH was checked. The concentrate and tailings materials were filtered, dried and weighed as described for the Ore 1 process.

The standard flotation procedure for Ore 3 is as follows. The grind size was determined as described hereinabove for Ore 1. The optimum grind time was 5 min 7 sec. A 900-g charge of ore, 0.6 g of lime, 32.5 μL of diesel, and 600 mL of water were charged into the rod mill. The optimum grind time was utilized and the material transferred to the flotation cell as described above in the Ore 1 procedure. Then, 1091 μL of a 1% solution of sodium ethyl xanthate and 28 μL of the 80/20 frother mentioned in the Ore 1 procedure were charged to the stirring liquid and conditioned for one min. The froth was collected for 3 min into a collection pan. The air was stopped and another 28 μL of frother and 546 μL of 1% sodium ethyl xanthate were added to the slurry. The air was restarted and a 1-min conditioning phase was performed. The froth was then collected for another 2 min into the collection. The concentrate and tailings material were filtered, dried and weighed as described for the Ore 1 process.

The standard flotation procedure for Ore 4 is as follows. The grind size was determined as described hereinabove for Ore 1, except the desired grind for Ore 4 was 20% plus 100 mesh (meaning 20% of the particles are 149 microns or larger). The optimum grind time to achieve these results was 13.75 min. A 1-kg charge of ore was utilized. The amount of lime added to the grind was 1.2 g along with 500 μL of the PAX/dithiophosphate (DTP) 238 solution. The PAX/DTP 238 solution was prepared by mixing 153 mL of distilled water with 0.5 mL DTP 238 and 0.5 gram of PAX. The pH of the slurry was 10.5 after diluting with 650 mL of water and transferring to the flotation cell and diluting with water up to the 2-L mark. The slurry was stirred without air and 2000 μL of PAX/DTP 238 solution were added along with 34 μL of a 50/50 vol. mixture of pine oil/MIBC. The pulp was stirred at 1200 rpm for one min and then the 8 L/min air was turned on. The froth was then raked over the weir for 3 min into a pan. The air was turned off and an additional 34 μL of pine oil/MIBC (frother) and 2000 μL of PAX/DTP were added followed by conditioning for 1 min. The air was then turned back on and the froth collected for an additional 3 min into the pan. The air was then turned off while adding another 34 μL of pine oil/MIBC and 2000 μL of PAX/DTP followed by conditioning for 1 min while stirring. The air was then turned on for another min, followed by collecting the froth for 3 min. The air and stirring were then turned off and the concentrate pan was removed and the pulp mixture vacuum filtered to give the concentrate that was then dried in an oven overnight at 85° C. The tailings mixture was then poured out into a filter with filter paper to obtain a wet tailings mixture. This mixture was dried in an oven overnight at 85° C. The weight of the concentrate and tailings were recorded before analytical analysis.

Table VIII summarizes Examples 30-37 and the wt. % recoveries of copper, molybdenum, and iron from the four ores tested, using the standard mining chemical collector for each ore and a polythiol composition of this invention at different amounts. Duplicates of each flotation experiment were conducted, and the average reported. The polythiol composition used was a composite, low odor, polythiol composition similar in components and amounts to that of Examples 25B-26B and 28B-29B. The polythiol composition used in the flotation testing (Examples 31, 33, 35, and 37) contained zero ene, less than 0.1% mono-S compounds, 90-91% DPDM compounds, and 9-10% heavies.

The standard for Ore 1 (Example 32) was a collector composition (per ton basis) containing 1200 g of lime, 1000 μL of 1% potassium amyl xanthate (PAX), 25 μL of medium cycle oil (MCO), 26 μL of MC 37 (mixture of TDDM and MCO), and 28 μL of plant frother 80% Nalco NALFLOTE® 9837/20% Cytec OREPREP® X-133. Example 33 for Ore 1 used a collector composition containing 1200 g of lime, 9 μL of the polythiol composition, and 28 μL of plant frother 80% Nalco NALFLOTE® 9837/20% Cytec OREPREP® X-133.

The standard for Ore 3 (Example 30) was a collector composition (per ton basis) containing 600 g of lime, 1637 μL of a 1% sodium ethyl xanthate solution in water, 32.5 μL of diesel, and 56 μL of pine oil/MIBC (frother). Example 31 for Ore 3 used a collector composition containing 600 g of lime, 5 μL of the polythiol composition, and 56 μL of pine oil/MIBC (frother).

The standard for Ore 2 (Example 34) was a collector composition (per ton basis) containing 600 g of lime, 12.5 μL of thionocarbamate Cytec AERO® XD 5002, 14 μL of thionocarbamate MX 7021, and 20 μL of frother Cytec AERO® X-133. Example 35 for Ore 2 used a collector composition containing 600 g of lime, 20 μL of the polythiol composition, and 20 μL of Cytec OREPREP® X-133 (frother).

The standard for the Ore 4 (Example 36) was a collector composition (per ton basis) containing 1100 g of lime, 6500 μL of 1% PAX/DTP 238, and 102 μL of pine oil/MIBC (frother). Example 37 for the Ore 4 used a collector composition containing 1100 g of lime, 15 μL the polythiol composition, and 102 μL of pine oil/MIBC (frother).

As shown in Table VIII, and unexpectedly, the collector compositions used in Examples 31 and 33 (containing polythiol compositions disclosed herein) had % recoveries of copper and molybdenum, independently, of over 90 wt. %. Moreover, and quite surprisingly, the % recoveries of copper and molybdenum in Example 33 were comparable to the mine standard of Example 32, and the % recoveries of copper and molybdenum in Example 31 were superior to the mine standard of Example 30.

The collector compositions used in Examples 35 and 37 were successful in recovering significant percentages of copper and molybdenum, but were not as efficient as the current mine standards for Ore 2 and Ore 4.

In addition to the testing results summarized in Table VIII, experiments similar to Example 33 were performed, but with 18 μL of the polythiol composition, and the % recoveries for Cu, Mo, and Fe were 90.3%, 91.2%, and 28.2%, respectively. Additional experiments similar to Example 31 also were performed, but with 9 or 18 μL of the polythiol composition, and the % recoveries for Cu, Mo, and Fe ranged from 93-96%, 92-96%, and 44-46%, respectively. Additional experiments similar to Example 35 also were performed, but with 10 or 40 μL of the polythiol composition, and the % recoveries for Cu, Mo, and Fe ranged from 50-76%, 63-67%, and 12-26%, respectively. And lastly, additional experiments similar to Example 37 were performed, but with 25 μL of the polythiol composition, and the % recoveries for Cu, Mo, and Fe were 78.6%, 63.0%, and 40.7%, respectively.

Examples 38-43

Flotation Recovery of Mining Chemicals

The flotation experiments of Examples 38-43 were performed similarly to Example 33 (containing a polythiol composition). As shown in Table IX, Examples 38-42 substituted TDDM and Example 43 substituted NDDM in place of the polythiol composition used in Example 33. Unexpectedly, the collector composition used in Example 33 (containing a polythiol composition disclosed herein) had % recoveries of copper and molybdenum, comparable to that of that of mining collector compositions containing either TDDM (tertiary dodecyl mercaptan) or NDDM (n-dodecyl mercaptan), under the same flotation conditions.

TABLE I

| Calculated product characteristics for polythiol components derived from limonene. | | | | | | | | | |
|---|---|---|---|---|---|---|---|---|---|
| N | —SH | —S— | Total S | MW | % SH | % Sulfide | % Total S | Ratio SH/S | SHEW |
| 1 | 2 | 0 | 2 | 204.3 | 31.37 | 0.00 | 31.37 | — | 102.2 |
| 2 | 2 | 1 | 3 | 374.5 | 17.11 | 8.56 | 25.67 | 2.00 | 187.4 |
| 3 | 2 | 2 | 4 | 544.7 | 11.76 | 11.76 | 23.53 | 1.00 | 272.5 |
| 4 | 2 | 3 | 5 | 714.9 | 8.96 | 13.44 | 22.41 | 0.67 | 357.7 |
| 5 | 2 | 4 | 6 | 885.1 | 7.24 | 14.48 | 21.72 | 0.50 | 442.8 |
| 6 | 2 | 5 | 7 | 1055.3 | 6.07 | 15.18 | 21.25 | 0.40 | 528.0 |

TABLE I-continued

Calculated product characteristics for polythiol components derived from limonene.

| N | —SH | —S— | Total S | MW | % SH | % Sulfide | % Total S | Ratio SH/S | SHEW |
|---|-----|-----|---------|--------|------|-----------|-----------|------------|-------|
| 7 | 2   | 6   | 8       | 1225.6 | 5.23 | 15.69     | 20.91     | 0.33       | 613.2 |
| 8 | 2   | 7   | 9       | 1395.8 | 4.59 | 16.07     | 20.66     | 0.29       | 698.3 |
| 9 | 2   | 8   | 10      | 1566.0 | 4.09 | 16.37     | 20.46     | 0.25       | 783.5 |

N is the number of substituted cyclohexyl moieties, —SH is the number of thiol groups, —S— is the number of sulfide groups, Total S is the total number of sulfur atoms, MW is the molecular weight of the polythiol compound (g/mol), % SH is the wt. % thiol sulfur, % Sulfide is the wt. % sulfide sulfur, % Total S is the wt. % sulfur, Ratio SH/S is the ratio of wt. % thiol sulfur to wt. % sulfide sulfur, and SHEW is the mercaptan equivalent weight.

TABLE II

Calculated product characteristics for illustrative polythiol compositions derived from limonene.

| | | | | | |
|---|---|---|---|---|---|
| N = 1       | 99.7  | 90   | 85   | 85   | 75   |
| N = 2       | 0.3   | 10   | 15   | 13   | 18   |
| N = 3       | 0     | 0    | 0    | 2    | 5    |
| N = 4       | 0     | 0    | 0    | 0    | 2    |
| N = 5       | 0     | 0    | 0    | 0    | 0    |
| N = 6       | 0     | 0    | 0    | 0    | 0    |
| % SH        | 31.3  | 29.9 | 29.2 | 29.1 | 27.4 |
| % Sulfide   | 0.03  | 0.86 | 1.28 | 1.35 | 2.40 |
| Ratio SH/S  | 1220  | 35   | 23   | 22   | 11   |
| % Total S   | 31.4  | 30.8 | 30.5 | 30.5 | 29.8 |
| SHEW        | 102.3 | 107.1| 109.7| 110.1| 117.1|

N is the number of substituted cyclohexyl moieties,
% SH is the wt. % thiol sulfur of the composition,
% Sulfide is the wt. % sulfide sulfur of the composition,
% Total S is the wt. % sulfur of the composition,
Ratio SH/S is the ratio of wt. % thiol sulfur to wt. % sulfide sulfur of the composition, and
SHEW is the mercaptan equivalent weight of the composition.

TABLE III

Polythiol compositions of Examples 1-8.

| Example | 1 | 2 | 3 | 4 | 5 | 6 | 7 | 8 |
|---|---|---|---|---|---|---|---|---|
| Wt. % TEP         | 0.00  | 0.45  | 0.45  | 0.45  | 0.23  | 0.00  | 0.45  | 0.45  |
| Wt. % Irgacure 500| 0.00  | 0.45  | 0.45  | 0.00  | 0.23  | 0.00  | 0.00  | 0.00  |
| $H_2S$:olefin ratio | 15    | 15    | 15    | 15    | 15    | 15    | 15    | 15    |
| Time (min)        | 105   | 17    | 15    | 15    | 15    | 85    | 33    | 30    |
| % Conv. (Raman)   | 95.9  | 94.6  | 94.1  | 94.8  | —     | 90.5  | —     | 97.9  |
| GC Analysis       |       |       |       |       |       |       |       |       |
| % ene             | 1.24  | 1.54  | 1.17  | 1.26  | 1.30  | 2.15  | 1.28  | 1.26  |
| % mono-S          | 6.98  | 1.72  | 3.52  | 1.93  | 9.51  | 18.98 | 3.05  | 1.93  |
| % DPDM            | 85.21 | 89.04 | 87.87 | 90.04 | 81.15 | 72.95 | 87.67 | 90.04 |
| % heavies         | 6.57  | 7.70  | 7.44  | 6.77  | 6.10  | 4.46  | 6.01  | 6.77  |
| Source of limonene| Treatt| Treatt| Or. Terp. 1 | Or. Terp. 1 | Or. Terp. 2 | Or. Terp. 2 | Or. Terp. 2 | Or. Terp. 2 |

GC Analysis represents area under the curve (area %), which is comparable to wt. %.

TABLE IV

Polythiol compositions of Examples 9-16.

| Example | 9 | 10 | 11 | 12 | 13 | 14 | 15 | 16 |
|---|---|---|---|---|---|---|---|---|
| Phosphite          | none  | TBP   | TBP   | TBP   | TBP   | TBP   | TBP   | TBP   |
| Wt. % Phosphite    | 0.00  | 0.41  | 1.35  | 0.81  | 0.10  | 0.10  | 0.15  | 0.27  |
| Wt. % Irgacure 500 | 0.00  | 0.00  | 0.00  | 0.00  | 1.00  | 0.50  | 0.30  | 0.27  |
| $H_2S$:olefin ratio | 15    | 15    | 15    | 15    | 15    | 15    | 15    | 15    |
| Time (min)         | 120   | 120   | 40    | 45    | 40    | 50    | 40    | 50    |
| % Conversion       | 91    | 92    | 99    | 100   | 99    | 96    | 96    | 97    |
| % Total S          | 28.7  | 28.9  | 29.9  | 30.0  | 29.9  | 30.1  | 29.9  | 29.5  |
| GC Analysis        |       |       |       |       |       |       |       |       |
| % ene              | 1.62  | 1.29  | 0.78  | 0.91  | 0.99  | 1.41  | 1.00  | 0.97  |
| % mono-S           | 17.19 | 15.14 | 2.24  | 1.94  | 3.16  | 3.47  | 3.76  | 4.54  |
| % DPDM             | 76.06 | 78.11 | 89.95 | 88.96 | 88.89 | 88.16 | 89.07 | 87.51 |
| % heavies          | 5.13  | 5.46  | 7.03  | 8.19  | 6.96  | 6.96  | 6.17  | 6.98  |

GC Analysis represents area under the curve (area %), which is comparable to wt. %.

TABLE V

Polythiol compositions of Examples 17-24.

| Example | 17 | 18 | 19 | 20 | 21 | 22 | 23 | 24 |
|---|---|---|---|---|---|---|---|---|
| Phosphite | none | none | TBP | TBP | TBP | TBP | TBP | TBP |
| Wt. % Phosphite | 0.00 | 0.00 | 0.10 | 0.10 | 0.27 | 0.27 | 0.27 | 0.27 |
| Wt. % Irgacure 500 | 0.00 | 1.00 | 1.00 | 1.00 | 0.27 | 0.27 | 0.27 | 0.27 |
| $H_2S$:olefin ratio | 15 | 15 | 15 | 15 | 15 | 15 | 15 | 15 |
| Time (min) | 120 | 95 | 40 | 40 | 50 | 50 | 30 | 40 |
| % Conversion | 91 | 99 | 99 | 99 | 97 | 97 | 99 | 98 |
| % Total S | 28.7 | 29.8 | 29.9 | 29.7 | 29.5 | 29.1 | 29.1 | 29.1 |
| GC Analysis | | | | | | | | |
| % ene | 1.62 | 1.10 | 0.99 | 1.02 | 0.97 | 1.16 | 0.79 | 0.98 |
| % mono-S | 17.19 | 4.33 | 3.16 | 2.31 | 4.54 | 5.74 | 1.82 | 2.80 |
| % DPDM | 76.06 | 88.08 | 88.89 | 89.85 | 87.51 | 87.19 | 87.63 | 89.83 |
| % heavies | 5.13 | 6.49 | 6.96 | 6.82 | 6.98 | 5.91 | 9.76 | 6.39 |

GC Analysis represents area under the curve (area %), which is comparable to wt. %.

TABLE VI

Polythiol compositions of Examples 25-29.

| Example | 25A | 25B | 26A | 26B | 27A | 28B | 29B |
|---|---|---|---|---|---|---|---|
| Wt. % TEP | 0.50 | | 0.50 | | 0.50 | | |
| Wt. % Irgacure 500 | — | | — | | — | | |
| $H_2S$:olefin ratio | 15 | | 15 | | 15 | | |
| Time (min) | 105 (75) | | 80 | | 60 | | |
| % Conversion | 97 | | 95 | | 97 | | |
| GC Analysis | | | | | | | |
| % ene | 0.80 | 0.00 | 0.80 | 0.00 | 0.98 | 0.00 | 0.00 |
| % mono-S | 3.32 | 0.04 | 2.63 | 0.06 | 2.95 | 0.39 | 0.56 |
| % DPDM | 88.72 | 90.51 | 87.89 | 89.92 | 87.97 | 90.22 | 90.08 |
| % heavies | 7.25 | 9.45 | 8.67 | 10.02 | 8.10 | 9.39 | 9.35 |

GC Analysis represents area under the curve (area %), which is comparable to wt. %.

TABLE VII

Ore composition summary (wt. %).

| Ore | Cu | Fe | Mo | S | Insolubles |
|---|---|---|---|---|---|
| Ore 2 | 0.48 | 2.70 | 0.010 | 0.97 | 90.5 |
| Ore 3 | 0.34 | 2.28 | 0.024 | 1.03 | 91.5 |
| Ore 1 | 0.26 | 2.99 | 0.039 | 0.98 | 82.7 |
| Ore 4 | 0.42 | 2.28 | 0.009 | 1.59 | 77.7 |

TABLE VIII

Summary of the mining chemical collector experiments of Examples 30-37.

| Ore | Example | Recoveries % | | | Grade % | | Dosage |
|---|---|---|---|---|---|---|---|
| | | Cu | Mo | Fe | Cu | Mo | |
| Ore 3 | 30 - Standard | 92.8 | 93.7 | 38.7 | 4.8 | 0.34 | |
| | 31 - Polythiol | 95.2 | 94.8 | 40.2 | 5.0 | 0.31 | 5 μL |
| Ore 1 | 32 - Standard | 91.2 | 92.8 | 24.4 | 9.7 | 1.37 | |
| | 33 - Polythiol | 91.1 | 92.4 | 16.5 | 7.4 | 1.15 | 9 μL |
| Ore 2 | 34 - Standard | 88.8 | 72.1 | 33.3 | 9.3 | 0.14 | |
| | 35 - Polythiol | 75.6 | 66.1 | 27.7 | 6.5 | 0.13 | 20 μL |
| Ore 4 | 36 - Standard | 89.9 | 67.3 | 48.9 | 3.5 | 0.06 | |
| | 37 - Polythiol | 81.4 | 65.5 | 44.8 | 5.6 | 0.10 | 15 μL |

TABLE IX

Summary of the mining chemical collector experiments of Examples 33 and 38-43.

| Ore | Example | Recoveries % | | | Grade % | | Dosage |
|---|---|---|---|---|---|---|---|
| | | Cu | Mo | Fe | Cu | Mo | |
| Ore 1 | 33 - Polythiol | 91.1 | 92.4 | 16.5 | 7.4 | 1.15 | 9 μL |
| Ore 1 | 38 - TDDM | 91.2 | 93.7 | 17.6 | 11.4 | 1.84 | 5 μL |
| Ore 1 | 39 - TDDM | 91.3 | 93.7 | 18.5 | 10.2 | 1.62 | 9 μL |
| Ore 1 | 40 - TDDM | 89.9 | 90.1 | 13.0 | 7.8 | 1.15 | 3 μL |
| Ore 1 | 41 - TDDM | 90.9 | 90.7 | 13.9 | 7.2 | 1.02 | 7 μL |
| Ore 1 | 42 - TDDM | 91.9 | 93.0 | 16.0 | 7.1 | 1.03 | 15 μL |
| Ore 1 | 43 - NDDM | 91.1 | 92.2 | 18.9 | 8.0 | 0.99 | 26 μL |

The invention is described above with reference to numerous aspects and embodiments, and specific examples. Many variations will suggest themselves to those skilled in the art in light of the above detailed description. All such obvious variations are within the full intended scope of the appended claims. Other embodiments of the invention can include, but are not limited to, the following (embodiments are described as "comprising" but, alternatively, can "consist essentially of" or "consist of"):

Embodiment 1

A polythiol composition comprising sulfur-containing compounds, the sulfur-containing compounds comprising:
(i) dipentene dimercaptan compounds;
(ii) at least 4% of a heavy fraction comprising intermolecular sulfide compounds having at least one (and often, two) thiol sulfur group (—SH), at least one intermolecular sulfide group (—S—), and at least two substituted cyclohexyl groups.

Embodiment 2

The polythiol composition of embodiment 1, wherein the heavy fraction comprises a compound having one of the following structures:

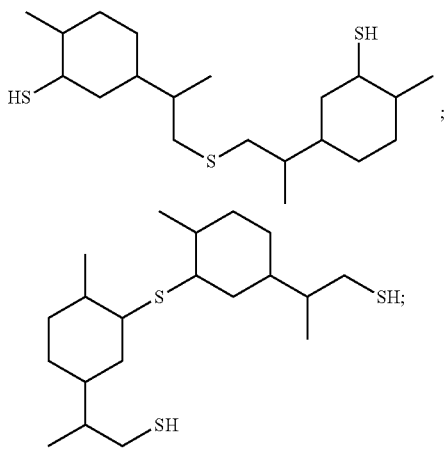

or combinations thereof.

Embodiment 3

The polythiol composition of embodiment 1 or 2, wherein the heavy fraction comprises a compound having one of the following structures:

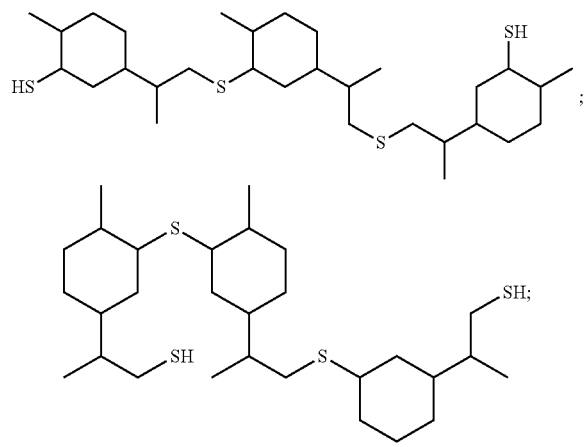

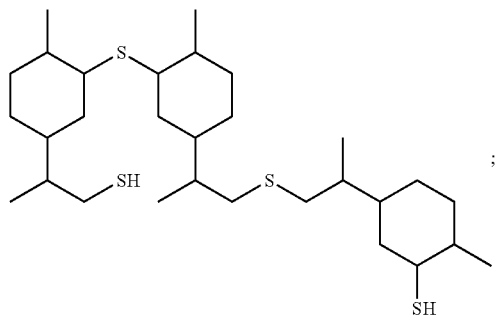 [SMILES: CC1CCC(C(C)CSCC(C)C2CCC(C)C(SC3CC(C(C)CS)CCC3C)C2)CC1S]

or combinations thereof.

Embodiment 4

The polythiol composition of any one of the preceding embodiments, wherein the sulfur-containing compounds of the polythiol composition have an amount of the heavy fraction (comprising intermolecular sulfide compounds) in any range disclosed herein, e.g., at least 5%, at least 6%, from 4% to 25%, from 4% to 15%, from 5% to 20%, or from 5% to 15%.

Embodiment 5

The polythiol composition of any one of the preceding embodiments, wherein the sulfur-containing compounds of the polythiol composition have an amount of the dipentene dimercaptan compounds in any range disclosed herein, e.g., from 50% to 95%, from 60% to 95%, from 60% to 92%, from 60% to 90%, from 70% to 92%, or from 80% to 92%.

Embodiment 6

The polythiol composition of any one of the preceding embodiments, wherein the sulfur-containing compounds of the polythiol composition have a maximum amount of monosulfur compounds in any range disclosed herein, e.g., less than or equal to 5%, less than or equal to 4%, less than or equal to 1%, less than or equal to 0.5%, or less than or equal to 0.25%.

Embodiment 7

The polythiol composition of embodiment 6, wherein the monosulfur compounds comprise a compound having the structure:

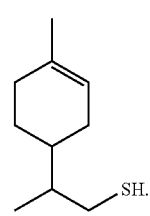

Embodiment 8

The polythiol composition of embodiment 6, wherein the monosulfur compounds comprise a compound having the structure:

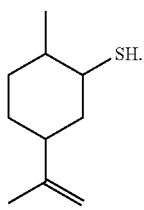

Embodiment 9

The polythiol composition of any one of the preceding embodiments, wherein the polythiol composition has a maximum amount of sulfur-free olefin-containing compounds in any range disclosed herein, e.g., less than or equal to 2%, less than or equal to 1%, less than or equal to 0.5%, or less than or equal to 0.1%.

Embodiment 10

The polythiol composition of any one of the preceding embodiments, wherein the sulfur-containing compounds comprise:
from 60% to 95% (or from 70% to 92%) of the dipentene dimercaptan compounds;
from 4% to 25% (or from 5% to 15%) of the heavy fraction (comprising intermolecular sulfide compounds); and
less than or equal to 4% (or less than or equal to 1%) of the monosulfur compounds.

Embodiment 11

The polythiol composition of any one of the preceding embodiments, wherein the sulfur-containing compounds of the polythiol composition have an average weight percentage of thiol sulfur (—SH) in any range of average weight percentages of thiol sulfur disclosed herein, e.g., from 27 to 30.5 wt. %, from 29 to 30.5 wt. %, from 28 to 30.3 wt. %, or from 29 to 30.2 wt. %.

Embodiment 12

The polythiol composition of any one of the preceding embodiments, wherein the sulfur-containing compounds of the polythiol composition have an average weight percentage of sulfide sulfur (—S—) in any range of average weight percentages of sulfide sulfur disclosed herein, e.g., from 0.25 to 5 wt. %, from 0.5 to 5 wt. %, from 0.5 to 3 wt. %, or from 0.75 to 4 wt. %.

Embodiment 13

The polythiol composition of any one of the preceding embodiments, wherein the sulfur-containing compounds of the polythiol composition have an average thiol sulfur (—SH) to sulfide sulfur (—S—) weight ratio in any range of average thiol sulfur to sulfide sulfur weight ratios disclosed herein, e.g., from 3:1 to 100:1, from 5:1 to 75:1, or from 10:1 to 50:1.

Embodiment 14

The polythiol composition of any one of the preceding embodiments, wherein the sulfur-containing compounds of the polythiol composition have a SHEW in any range of SHEW's disclosed herein, e.g., from 104 to 125 g/eq, from 104 to 120 g/eq, from 105 to 125 g/eq, or from 105 to 120 g/eq.

Embodiment 15

The polythiol composition of any one of the preceding embodiments, wherein the polythiol composition does not have an offensive odor (or the sulfur-containing compounds of the polythiol composition do not have an offensive odor).

Embodiment 16

The polythiol composition of any one of the preceding embodiments, wherein the polythiol composition is produced by a process comprising:
1) contacting:
a) limonene;
b) $H_2S$; and
c) optionally, a phosphite compound; and
2) forming the polythiol composition;
wherein a molar ratio of $H_2S$ to carbon-carbon double bonds of the limonene is in a range from 2:1 to 500:1.

Embodiment 17

The composition of embodiment 16, wherein the process further comprises a step of removing at least a portion of the $H_2S$, of the phosphite compound (if used), of the limonene, of monosulfur compounds, or combinations thereof, from the polythiol composition.

Embodiment 18

The composition of embodiment 17, wherein the $H_2S$, the phosphite compound (if used), the limonene, the monosulfur compounds, or combinations thereof, are removed by wiped film evaporation, distillation, short path distillation, or a combination thereof.

Embodiment 19

The composition of any one of embodiments 16-18, wherein the molar ratio of $H_2S$ to carbon-carbon double bonds of the limonene is in any range of molar ratios of $H_2S$ to carbon-carbon double bonds disclosed herein, e.g., from 2:1 to 150:1, from 2:1 to 50:1, from 3:1 to 50:1, from 5:1 to 35:1, or from 8:1 to 25:1.

Embodiment 20

The composition of any one of embodiment 16-19, wherein a molar ratio of the phosphite compound to carbon-carbon double bonds of the limonene is in any range of molar ratios of the phosphite compound to carbon-carbon double bonds disclosed herein, e.g., from 0.0005:1 to 0.10:1, or from 0.005:1 to 0.05:1.

Embodiment 21

The composition of embodiment 20, wherein the phosphite compound comprises a compound having the formula, $P(OR^1)_3$, wherein each $R^1$ is independently any $C_1$-$C_{10}$ hydrocarbyl group disclosed herein.

Embodiment 22

The composition of embodiment 20, wherein the phosphite compound comprises trimethylphosphite, triethylphosphite, tributylphosphite, or any combination thereof.

Embodiment 23

The composition of any one of embodiments 16-22, wherein the polythiol composition is formed at a temperature in any range of temperatures disclosed herein, e.g., from −30° C. to 150° C., from −20° C. to 130° C., from −10° C. to 100° C., from −5° C. to 80° C., or from 0° C. to 60° C.

Embodiment 24

The composition of any one of embodiments 16-23, wherein the polythiol composition is formed in the presence of electromagnetic radiation.

Embodiment 25

The composition of any one of embodiments 16-23, wherein the polythiol composition is formed in the presence of ultraviolet light.

Embodiment 26

The composition of any one of embodiments 16-23, wherein the polythiol composition is formed in the presence of ultraviolet light and a photoinitiator, and wherein the photoinitiator is present at an amount within any weight percentage range disclosed herein, e.g., less than or equal to 5 wt. %, less than or equal to 3 wt. %, less than or equal to 2 wt. %, or less than or equal to 1.5 wt. %, based on the weight of the limonene.

Embodiment 27

The composition of any one of embodiments 16-23, wherein the polythiol composition is formed in the presence of a free radical initiator, and wherein the free radical initiator is present at an amount within any weight percentage range disclosed herein, e.g., from 0.1 to 9 wt. %, or from 0.1 to 2 wt. %, based on the weight of the limonene.

Embodiment 28

The composition of embodiment 27, wherein the polythiol composition is formed at conditions suitable for a thermal decomposition of the free radical initiator.

Embodiment 29

The composition of any one of embodiments 16-28, wherein the polythiol composition is formed in the presence of any solvent disclosed herein, e.g., a hydrocarbon solvent, an aromatic hydrocarbon solvent, a ketone solvent, an alcohol solvent, an ether solvent, or any combination thereof.

Embodiment 30

The composition of any one of embodiments 16-29, wherein at least 90%, at least 95%, or at least 98%, of the carbon-carbon double bonds of the limonene have reacted to form a sulfur-containing group.

Embodiment 31

A collector composition comprising the polythiol composition of any one of embodiments 1-30.

Embodiment 32

A collector composition comprising water and the polythiol composition of any one of embodiments 1-30.

Embodiment 33

A collector composition comprising the polythiol composition of any one of embodiments 1-30 and any suitable pH control agent or any pH control agent disclosed herein, e.g., a carbonate compound, or lime.

Embodiment 34

A collector composition comprising the polythiol composition of any one of embodiments 1-30 and any suitable frothing agent or any frothing agent disclosed herein, e.g., MIBC, methyl isobutyl carbinol, pine oil, NALFLOTE® 9837, Cytec OREPREP® X-133, etc., or any combination thereof.

Embodiment 35

A collector composition comprising the polythiol composition of any one of embodiments 1-30, a frothing agent, a pH control agent, and water.

Embodiment 36

The collector composition of any one of embodiments 32-35, wherein the collector composition further comprises any (second) suitable collector agent or any second collector agent disclosed herein, e.g., a xanthate, a xanthic ester, a thionocarbonate, a dialkyl dithiophosphate, etc., or any combination thereof.

Embodiment 37

A flotation process for the recovery of a metal from an ore, the process comprising contacting the ore with the collector composition of any one of embodiments 32-36 or the polythiol composition of any one of embodiments 1-30.

Embodiment 38

The process of embodiment 37, wherein the metal comprises a transition metal.

Embodiment 39

The process of embodiment 37, wherein the metal comprises gold, silver, platinum, copper, nickel, iron, lead, zinc, molybdenum, cobalt, chromium, or combinations thereof.

Embodiment 40

The process of embodiment 37, wherein the metal comprises copper.

Embodiment 41

The process of embodiment 37, wherein the metal comprises molybdenum.

Embodiment 42

The process of any one of embodiments 37-41, wherein the ore comprises a copper-bearing ore and/or a molybdenum-bearing ore.

Embodiment 43

The process of any one of embodiments 37-41, wherein the ore comprises chalcopyrite.

Embodiment 44

The process of any one of embodiments 37-41, wherein the ore comprises chalcocite.

Embodiment 45

The process of any one of embodiments 37-44, wherein the polythiol composition and the ore are contacted at a weight ratio in a range from about 0.001 lb of polythiol composition per ton of ore to about 5 lb of polythiol composition per ton of ore.

Embodiment 46

The process of any one of embodiments 37-45, wherein the % recovery of copper and/or molybdenum is at least about 80 wt. %, at least about 85 wt. %, or at least about 90 wt. %.

Embodiment 47

The process of any one of embodiments 37-46, wherein the % recovery of copper and/or molybdenum is greater than a mine standard, or within about 2 wt. %, or within about 1 wt. %, of a mine standard, under the same flotation conditions.

Embodiment 48

The process of any one of embodiments 37-47, wherein the % recovery of copper and/or molybdenum is greater than that of TDDM or NDDM, or within about 2 wt. %, or within about 1 wt. %, of the % recovery using TDDM or NDDM, under the same flotation conditions.

We claim:

1. A flotation process for the recovery of a metal from an ore, the process comprising:
   contacting the ore with a collector composition, wherein the collector composition comprises a polythiol composition comprising sulfur-containing compounds, the sulfur-containing compounds comprising:
   (i) dipentene dimercaptan compounds; and
   (ii) at least 4 wt. % of a heavy fraction comprising intermolecular sulfide compounds having at least one thiol sulfur group (—SH), at least one intermolecular sulfide group (—S—), and at least two substituted cyclohexyl groups.
2. The process of claim 1, wherein the heavy fraction comprises intermolecular sulfide compounds having two thiol sulfur groups (—SH), one intermolecular sulfide group (—S—), and two substituted cyclohexyl groups.
3. The process of claim 1, wherein the heavy fraction comprises intermolecular sulfide compounds having two thiol sulfur groups (—SH), two intermolecular sulfide groups (—S—), and three substituted cyclohexyl groups.
4. The process of claim 1, wherein the sulfur-containing compounds contain from 60 wt. % to 95 wt. % dipentene dimercaptan compounds.
5. The process of claim 4, wherein the polythiol composition contains less than or equal to 1 wt. % sulfur-free olefin-containing compounds.
6. The process of claim 1, wherein the sulfur-containing compounds contain:
   from 5 wt. % to 20 wt. % heavy fraction; and
   less than or equal to 4 wt. % monosulfur compounds.
7. The process of claim 1, wherein the sulfur-containing compounds are characterized by:
   an average thiol sulfur to sulfide sulfur weight ratio in a range from 3:1 to 100:1;
   an average of from 0.25 wt. % to 5 wt. % sulfide sulfur;
   an average of from 27 wt. % to 30.5 wt. % thiol sulfur;
   a mercaptan equivalent weight in a range from 104 to 120 g/eq; or
   any combination thereof.
8. The process of claim 1, wherein the metal comprises gold, silver, platinum, copper, nickel, iron, lead, zinc, molybdenum, cobalt, chromium, or combinations thereof.
9. The process of claim 1, wherein the metal comprises copper, and a percent recovery of copper from the ore is at least 85 wt. %.
10. The process of claim 1, wherein the metal comprises molybdenum, and a percent recovery of molybdenum from the ore is at least 85 wt. %.
11. The process of claim 1, wherein the collector composition and the ore are contacted at an amount of the polythiol composition per ton of ore in a range from about 0.001 lb to about 5 lb.
12. The process of claim 1, wherein the ore comprises a copper-bearing ore and/or a molybdenum-bearing ore.
13. The process of claim 1, wherein the process is characterized by;
   a percent recovery of copper from the ore that is greater than or within about 2 wt. % of a mine standard for the ore, under the same flotation conditions;
   a percent recovery of molybdenum from the ore is greater than or within about 2 wt. % of a mine standard for the ore, under the same flotation conditions; or
   both.
14. The process of claim 1, wherein the process is characterized by;
   a percent recovery of copper from the ore that is greater than or within about 2 wt. % of a percent recovery using TDDM instead of the polythiol composition, under the same flotation conditions;
   a percent recovery of copper from the ore that is greater than or within about 2 wt. % of a percent recovery using NDDM instead of the polythiol composition, under the same flotation conditions;
   a percent recovery of molybdenum from the ore that is greater than or within about 2 wt. % of a percent recovery using TDDM instead of the polythiol composition, under the same flotation conditions;
   a percent recovery of molybdenum from the ore that is greater than or within about 2 wt. % of a percent recovery using NDDM instead of the polythiol composition, under the same flotation conditions; or any combination thereof.

15. A collector composition comprising water and a polythiol composition comprising sulfur-containing compounds, the sulfur-containing compounds comprising:
   (i) dipentene dimercaptan compounds; and
   (ii) at least 4 wt. % of a heavy fraction comprising intermolecular sulfide compounds having at least one thiol sulfur group (—SH), at least one intermolecular sulfide group (—S—), and at least two substituted cyclohexyl groups.

16. The collector composition of claim 15, wherein the sulfur-containing compounds comprise:
   from 70 wt. % to 92 wt. % dipentene dimercaptan compounds;
   from 4 wt. % to 25 wt. % heavy fraction; and
   less than or equal to 4 wt. % monosulfur compounds.

17. The collector composition of claim 15, wherein the collector composition further comprises a pH control agent.

18. The collector composition of claim 15, wherein the collector composition further comprises a frothing agent.

19. The collector composition of claim 15, wherein the collector composition comprises water, the polythiol composition, a frothing agent, and a pH control agent.

20. The collector composition of claim 15, wherein the collector composition further comprises a second mining chemical collector agent.

* * * * *